United States Patent [19]
Brown et al.

[11] Patent Number: 5,990,850
[45] Date of Patent: *Nov. 23, 1999

[54] METALLODIELECTRIC PHOTONIC CRYSTAL

[75] Inventors: Elliott R. Brown, Arlington, Va.; John D. Joannopoulos, Belmont, Mass.; Shanhui Fan, Somerville, Mass.; Pierre R. Villeneuve, Boston, Mass.; Oliver B. McMahon, Nashua, N.H.

[73] Assignee: Massachusetts Institute of Technology, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,542

[22] Filed: Sep. 5, 1996

Related U.S. Application Data

[63] Continuation-in-part of application No. 08/406,180, Mar. 17, 1995, abandoned.

[51] Int. Cl.⁶ .......................... H01Q 15/14; H01Q 15/02

[52] U.S. Cl. .......................................... 343/912; 343/909

[58] Field of Search ........................... 343/909, 700 MS, 343/795, 912, 913; 333/291.1; H01Q 15/14, 15/02

[56] References Cited

U.S. PATENT DOCUMENTS

| | | | |
|---|---|---|---|
| 2,577,619 | 12/1951 | Kock | 343/909 |
| 3,553,694 | 1/1971 | Clark | 343/909 |
| 5,187,461 | 2/1993 | Brommer et al. | 333/219.1 |
| 5,281,370 | 1/1994 | Asher et al. | 264/1.1 |
| 5,385,114 | 1/1995 | Milstein et al. | 117/1 |
| 5,389,943 | 2/1995 | Brommer et al. | 343/909 |
| 5,440,421 | 8/1995 | Fan et al. | 359/344 |
| 5,497,168 | 3/1996 | Thomas et al. | 343/909 |
| 5,600,342 | 2/1997 | Pikulski et al. | 343/795 |

FOREIGN PATENT DOCUMENTS

| | | |
|---|---|---|
| 82705 | 4/1957 | Denmark . |
| 985-981 | 12/1982 | U.S.S.R. . |
| 92/11547 | 7/1992 | WIPO . |
| 92/15124 | 9/1992 | WIPO . |
| 92/16031 | 9/1992 | WIPO . |

OTHER PUBLICATIONS

IEEE Transactions on Antennas and Propagation, vol. AP–14, No. 3, pp. 302–337, May 1966, "Numerical Solution of Initial Boundary Value Problems Involving Maxwell's Equations in Isotropic Media", By Kane S. Yee.

IEEE Transactions on Antennas and Propagation, vol. 39, No. 10, pp. 1518–1525, Oct. 1991, "Analysis of the Numerical Error Caused by the Stair–Stepped Approximation of a Conducting Boundary in FDTD Simulations of Electromagnetic Phenomena" by Cangellaris et al.

IEEE Transactions on Electromagnetic Compatibility, vol. EMC–23, No. 4, pp. 377–382, Nov. 1981, "Absorbing Boundary Conditions for the Finite–Difference Approximation of the Time–Domain Electromagnetic–Field Equations" by Gerrit Mur.

(List continued on next page.)

Primary Examiner—Hoanganh Le
Attorney, Agent, or Firm—Samuels, Gauthier & Stevens, LLP

[57] ABSTRACT

A metallodielectric photonic crystal including a plurality of elements, each having a non-dielectric component, arranged with respect to each other in a three-dimensionally periodic lattice. The non-dielectric components being spatially isolated from one another, the lattice exhibiting a band gap in the spectrum of electromagnetic radiation modes propagating through said lattice. A support structure positions the elements in the three-dimensionally periodic lattice. In an exemplary embodiment, the elements are metallic spheres arranged within dielectric material. The three-dimensionally periodic lattice can include a face-centered-cubic lattice which exhibits a unidirectional photonic band gap, or a diamond lattice which exhibits an omnidirectional photonic band gap. The diamond lattice structure includes a gap width to midgap frequency ratio which can exceed 60%.

31 Claims, 20 Drawing Sheets

OTHER PUBLICATIONS

Physical Review B, vol. 45, No. 4, pp. 1538–1548, Jan. 1992, "Ab initio molecular–dynamics techniques extended to large–length–scale systems" by Arias et al.

Physical Review B, vol. 51, No. 23, pp. 635–642, Jun. 1995, "Order–N spectral method for electromagnetic waves" by Chan et al.

Prog. Quant. Electr., 1994, vol. 18, pp. 153–200, "Photonic Bandgaps in Periodic Dielectric Structures" by Villeneuve et al.

Physical Review Letters, vol. 76, No. 14, pp. 2480–2483, Apr. 1996, "3D Wire Mesh Photonic Crystals", by Sievenpiper et al.

Applied Phys. Letter, vol. 67, No. 15, pp. 2138–2140, Oct., 1995 "Large electromagnetic stop bands in metallodielectric photonic crystals", by Brown et al.

Electronics Letters, vol. 30, No. 25, pp. 2166–2167, Dec. 1994, "Design of ultrawideband photonic crystals for broadband antenna applications", by Agi et al.

Solid State Communications, vol. 89, No. 5, pp. 413–416, 1994, "Photonic Band Gaps in Three Dimensions: New Layer–by–Layer Periodic Structures", by Ho et al.

Appl. Phys. Letter, vol. 64, No. 16, pp. 2059–2061, Apr. 1994, "Micromachined millimeter–wave photonic band–gap crystals", by Özbay et al.

Physical Review Letters, vol. 58, No. 20, pp. 2059–2062, May 1987, "Inhibited Spontaneous Emission in Solid–State Physics and Electronics", by Eli Yablonovitch.

AMSE Press, vol. 18, No. 2, pp. 59–64, 1988, "An Artificial Dielectric Wedge for Antenna Beam Steering", by M.R. Khan.

IEEE, 1971 Int'l Electric and Electronics Conference, pp. 32–33, "An Artificial Dielectric Lens Suitable for High Power Applications", by Manwarren et al.

Appl. Phys. Letters, vol. 65, No. 5, pp. 645–647, Aug. 1994, "Experimental and theoretical results for a two–dimensional metal photonic band–gap cavity", by Smith et al.

Appl. Phys. Letters, vol. 61, No. 4, pp. 495–497, Jul. 1992, "Existence of a photonic band gap in two dimensions", by Meade et al.

Physical Review Letters, vol. 68, No. 13, pp. 2023–2026, Mar. 1992, "Measurement of Photonic Band Structure in a Two–Dimensional Periodic Dielectric Array", by Robertson et al.

Physical Review Letters, vol. 67, No. 17, pp. 2295–2298, Oct. 1991, "Photonic Band Structure: The Face–Center–Cubid Case Employing Nonspherical Atoms", Yablonovitch et al.

"Principles of Optics: Electromagnetic Theory of Propagation, Interference and Diffraction of Light" Sixth (Corrected) Edition, pp. 632–659, by Max Born and Emil Wolf, published by Pergamon Press.

Microwave and Optical Technology Letters, vol. 7, No. 17, pp. 777–779, Dec., 1994, "A New Face–Centered–Cubic Photonic Crystal for Microwave and Millimeter–Wave Applications", by Brown et al.

Physical Review B., vol. 48, No. 23, pp. 576–579, Dec. 1993, "Photonic band structures of two– and three–dimensional periodic metal or semiconductor arrays", by McGurn et al.

Physical Review Letters, vol. 65, No. 25, pp. 3152–3155, Dec. 1990, "Existence of a Photonic Gap in Periodic Dielectric Structures", by Ho et al.

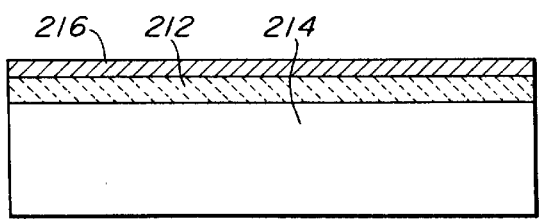
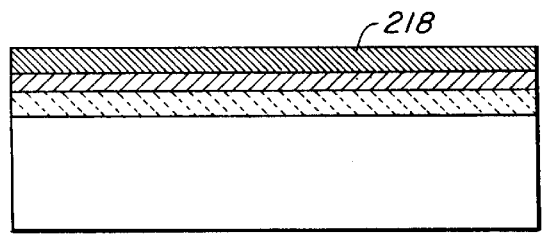
FIG. 8A    FIG. 8B
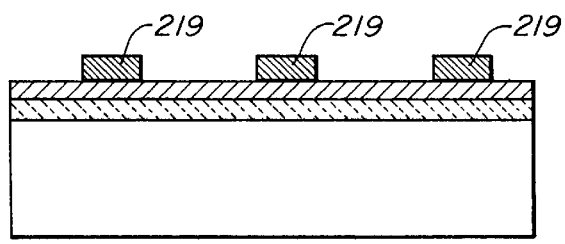
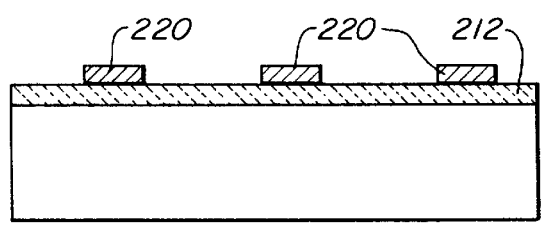
FIG. 8C    FIG. 8D
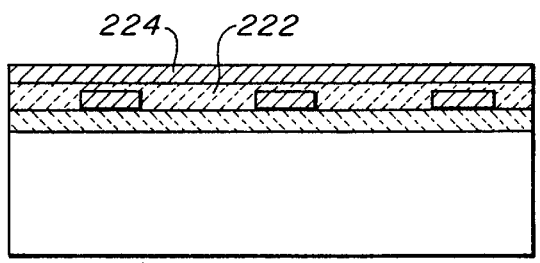
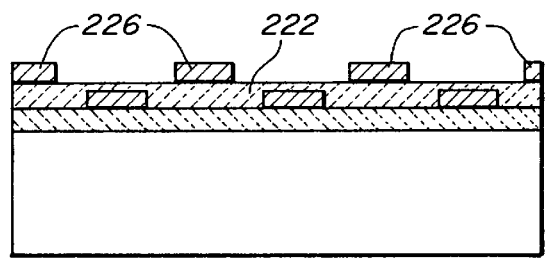
FIG. 8E    FIG. 8F

0                                    MAX

METALLODIELECTRIC PHOTONIC CRYSTAL

RELATED APPLICATIONS

This application is a continuation-in-part of Ser. No. 08/406,180, filed Mar. 17, 1995, entitled "Metallodielectric Photonic Crystal", now abandoned.

GOVERNMENT SUPPORT

This invention was made with Government support under Contract No. F19628-95-C-0002 awarded by the U.S. Air Force and NSF Grant No. 9022933-DMR. The Government has certain rights in the invention.

BACKGROUND OF THE INVENTION

The invention is directed to metallodielectric photonic crystals (MDPCs) which exhibit both unidirectional and omnidirectional photonic band gaps.

Photonic crystals are of great interest in the field of electromagnetics because certain types of photonic crystals exhibit a photonic band gap or stop band. The band gap defines a range of frequencies at which electromagnetic radiation striking the crystal is reflected by the crystal rather than being permitted to propagate through it.

The typical photonic crystal is a spatially periodic structure. One well-known photonic crystal is formed of multiple elements of a dielectric material arranged in a three-dimensional lattice. Other crystals exhibit two-dimensional periodicity in which elongated, e.g. cylindrical, elements made of dielectric material are arranged in a two-dimensional periodic pattern with their longitudinal axes parallel to each other.

In these crystals, the dimensions of the lattice structures and the dielectric elements are selected to produce band gaps having desired center frequencies and bandwidths. Electromagnetic radiation at a frequency within the band gap is reflected from the structure via the well-known Bragg reflection phenomenon.

As previously described, three-dimensionally periodic structures can give rise to photonic band gaps, characterized by the absence of propagation of electromagnetic radiation along directions in space. To date, the structures studied have consisted of a combination of two or more lossless dielectric materials. In general, the size of the band gaps in these conventional all-dielectric crystals is less than 30% of the center frequency and the maximum rejection is less than 10 dB per lattice constant. The limited rejection follows partly from the finite size of the band gaps. By increasing the size of the gap, the rejection coefficient can be significantly increased.

It is therefore an object of the present invention to provide an improved photonic crystal which exhibits an increased band gap size with respect to conventional crystals.

It is another object of the invention to provide a metallodielectric photonic crystal which not only gives rise to large rejection along certain directions in space, but along every direction.

SUMMARY OF THE INVENTION

Accordingly, the present invention is directed to a metallodielectric photonic crystal including a plurality of elements, each having a non-dielectric component, arranged with respect to each other in a three-dimensionally periodic lattice. The non-dielectric components being spatially isolated from one another, the lattice exhibiting a band gap in the spectrum of electromagnetic radiation modes propagating through said lattice. A support structure positions the elements in the three-dimensionally periodic lattice. In an exemplary embodiment, the elements are metallic spheres arranged within dielectric material. The three-dimensionally periodic lattice can include a face-centered-cubic lattice which exhibits a unidirectional photonic band gap, or a diamond lattice which exhibits an omnidirectional photonic band gap. The diamond lattice structure includes a gap width to midgap frequency ratio which can exceed 60%.

BRIEF DESCRIPTION OF THE DRAWINGS

The foregoing and other objects, features and advantages of the invention will be apparent from the following more particular description of exemplary embodiments of the invention as illustrated in the accompanying drawings in which like reference characters refer to the same parts throughout the different views. The drawings are not necessarily to scale, emphasis instead being placed upon illustrating the principles of the invention.

FIGS. 8A–8I are schematic cross-sectional illustrations showing fabrication steps used to produce an integrated circuit embodiment of the three-dimensional metallodielectric photonic crystal of the invention;

DETAILED DESCRIPTION OF THE ILLUSTRATED EMBODIMENTS

Figure 1:
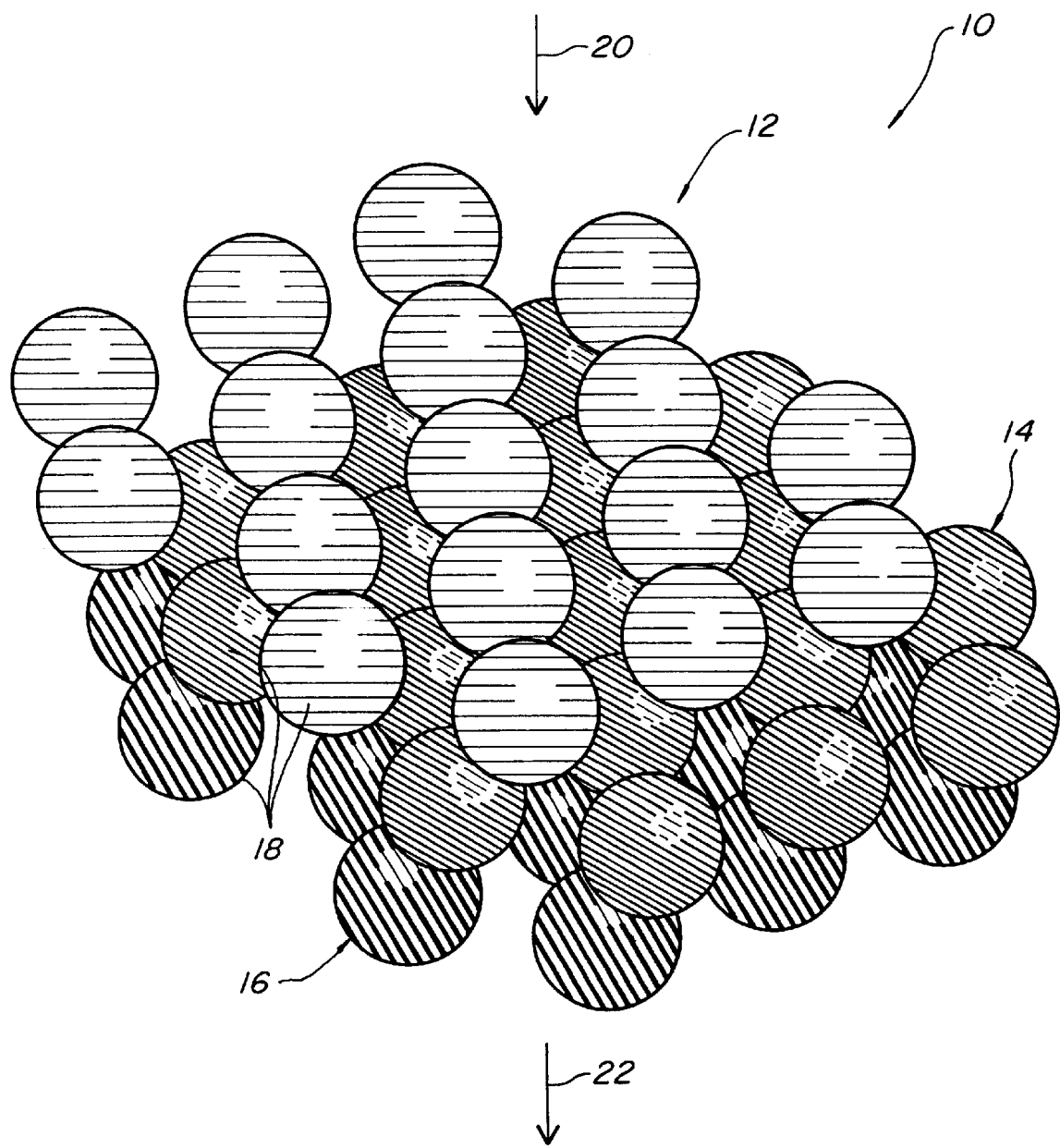
FIG. 1 is a schematic perspective view of the three-dimensional metallodielectric photonic crystal of the invention configured in a face-centered cubic lattice.

FIG. 1 is a schematic perspective view of an exemplary embodiment of the three-dimensional photonic crystal structure 10 of the invention. The structure shown in the figure includes three layers 12, 14 and 16 of electrically conductive spherical elements 18. In this embodiment, the spheres 18 are arranged in a close-packed face-centered cubic lattice. Three layers 12, 14 and 16 are shown to completely illustrate one period of the lattice. However, it will be understood that more than three layers can be used. While the spheres 18 are close-packed, they are maintained at a distance away from each other such that they do not touch. It should be noted that different shading is used in the drawings to distinguish between layers of elements 18. The spherical elements 18 are, for example, made of the same material, for example, a high-electrical-conductivity metal such as chrome steel, brass, carbon steel or stainless steel.

The electrical conductivity of brass is $2.564 \times 10^7$ S/m at 20° C. For chromium, the conductivity is $3.846 \times 10^7$ S/m, and for stainless steel, the conductivity is $1.1 \times 10^6$ S/m. (see David M. Pozar, Microwave Engineering, Addison-Wesley Publishing Co., 1990). For the metallodielectric photonic crystal of FIG. 1, the high-electrical-conductivity elements 18 preferably have similar conductivities. It will be appreciated by those of skill in the art that other variations of electrically conductive elements or elements having nondielectric components will be within the scope of the invention.

Figure 2:
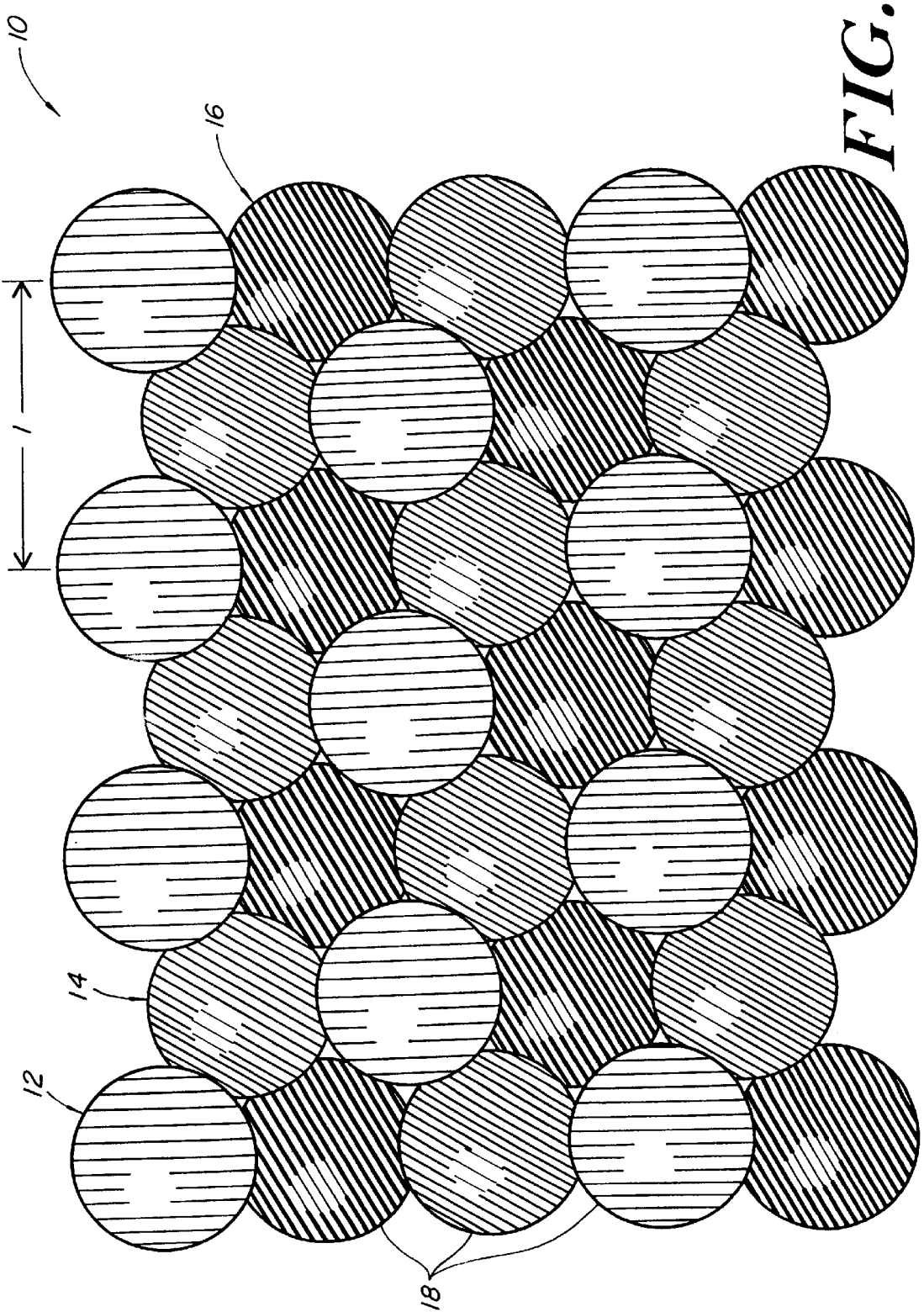
FIG. 2 is a schematic top view of the face-centered cubic metallodielectric photonic crystal structure of FIG. 1.

FIG. 2 is a schematic top view of the three-dimensional photonic crystal structure 10 of FIG. 1. FIG. 2 schematically illustrates the spatial relationships among the individual layers 12, 14 and 16 of the structure 10. As shown in the drawing, each layer comprises a two-dimensional periodic arrangement of spherical elements 18. In the embodiment shown, the two-dimensional periodic arrangement is a triangular lattice with lattice constant t representing the distance between centers of the elements 18. As shown, each element in the middle layer 14 is located beneath the center of a triangle defined by elements of the top layer 12. Likewise, each element in the bottom layer 16 is located beneath the center of a triangle defined by elements in the top layer 12. This arrangement of elements 18 produces a close-packed face-centered cubic lattice structure.

The lattice structure 10 shown in FIGS. 1 and 2 exhibits a forbidden frequency range or frequency band gap or stop band which defines a range of frequencies of electromagnetic radiation which is prevented from propagating through the structure 10. Electromagnetic energy having a frequency outside of the stop band propagating as indicated by arrow 20 (see FIG. 1) passes through the structure and continues to propagate as indicated by arrow 22. However, electromagnetic energy having a frequency within the frequency stop band is reflected by the structure 10.

Figure 3:
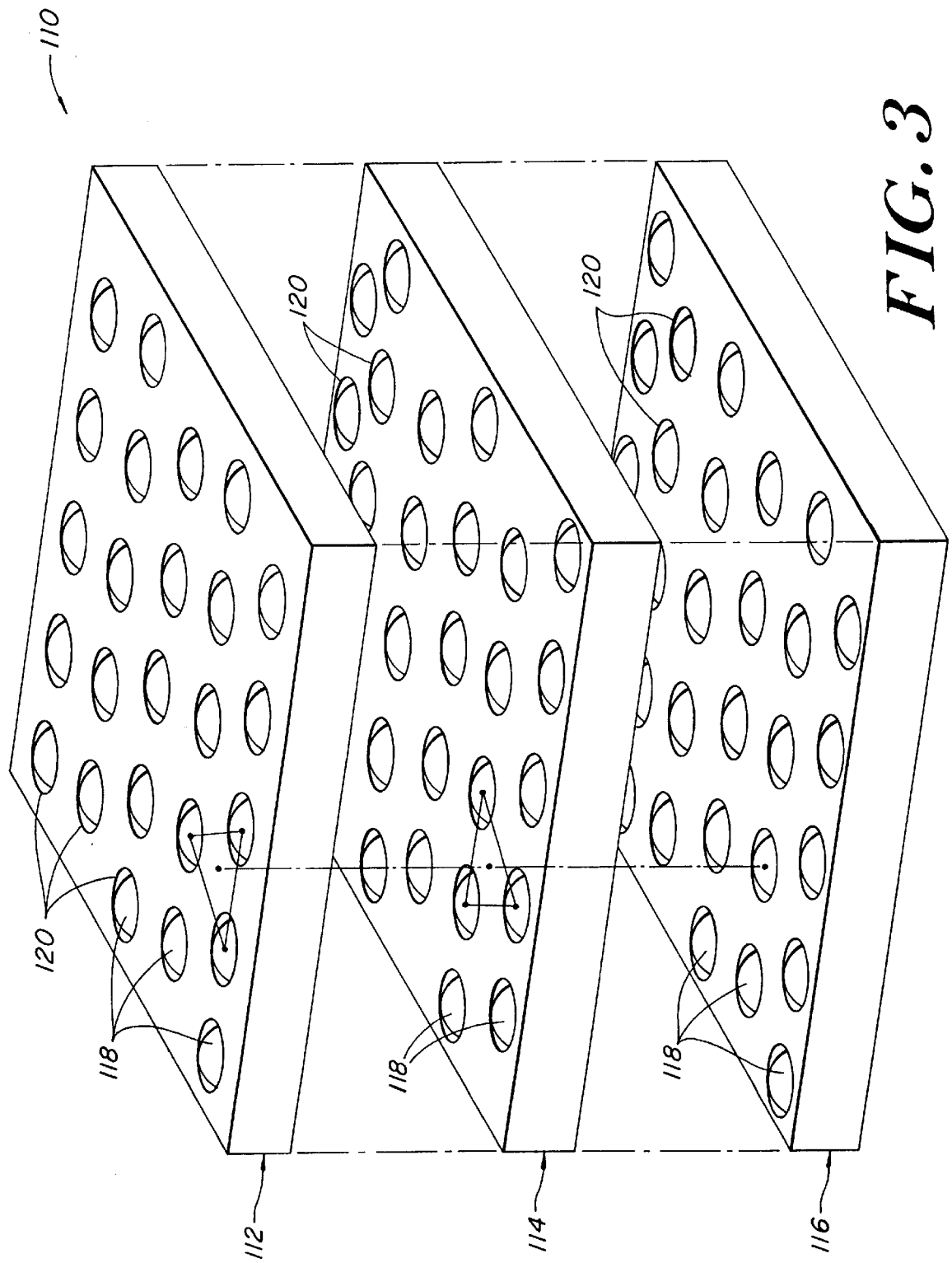
FIG. 3 is a schematic perspective exploded view of an embodiment of the invention comprising stacked dielectric sheets containing metallic atoms of the three-dimensional periodic structure of the invention.
Figure 4A:
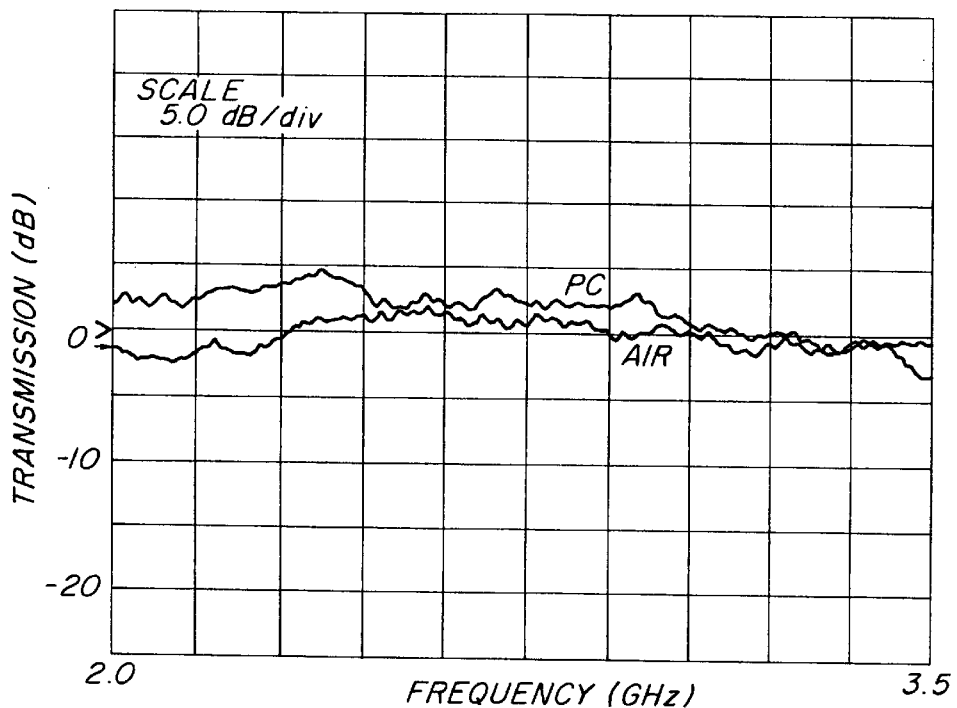
FIGS. 4A–4D are plots of the transmission characteristic of the dielectric background material of the stacked-dielectric-sheet embodiment of the face-centered cubic metallodielectric photonic crystal of the invention.
Figure 4B:
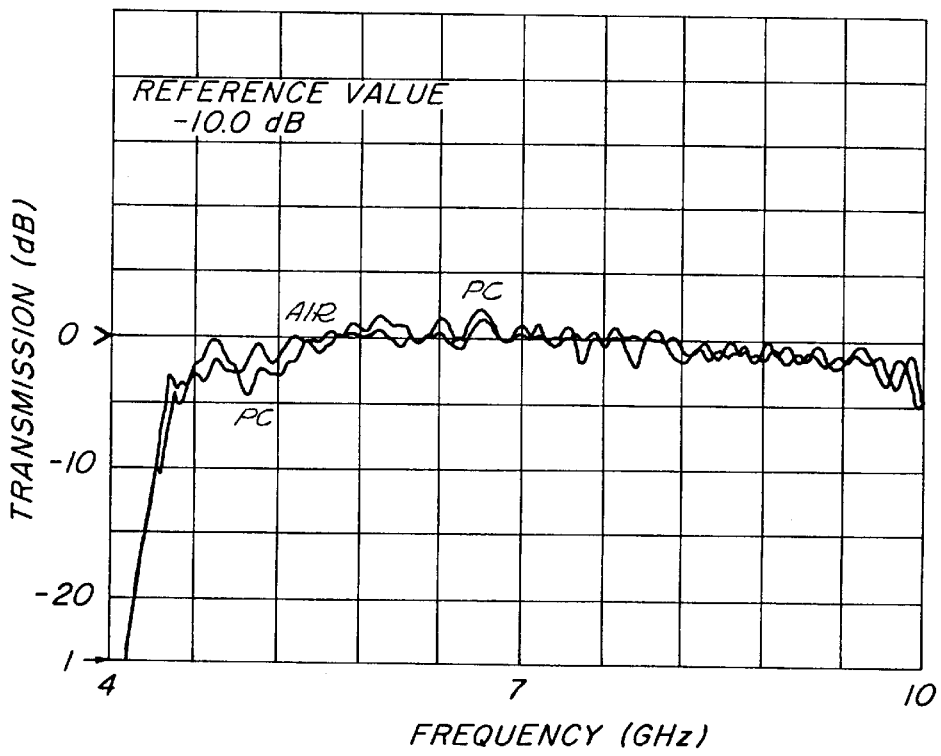
Figure 4C:
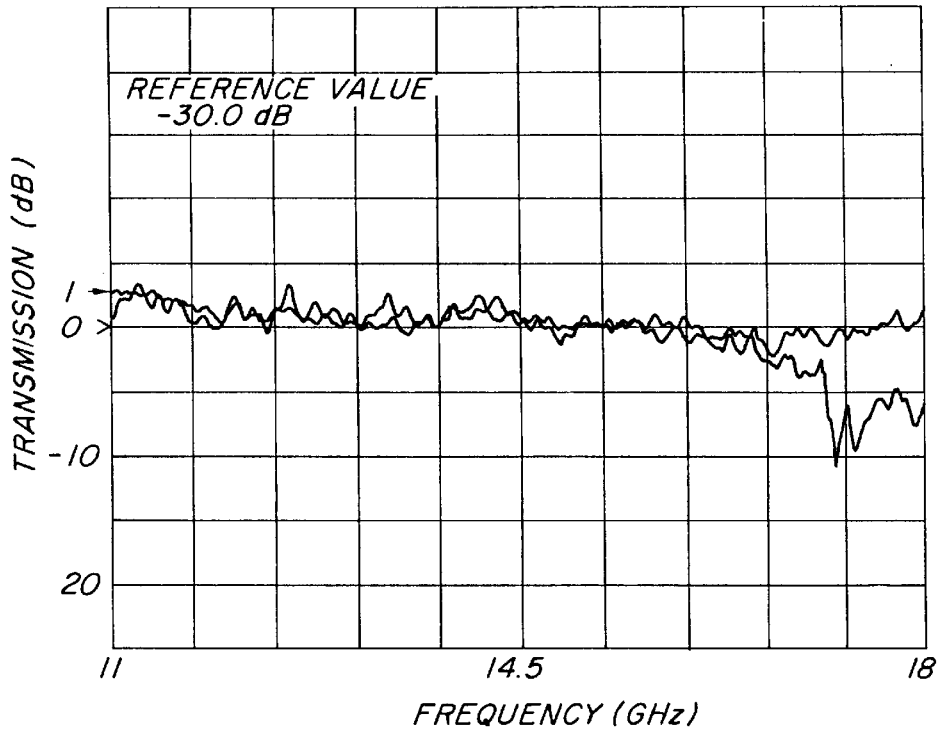
Figure 4D:
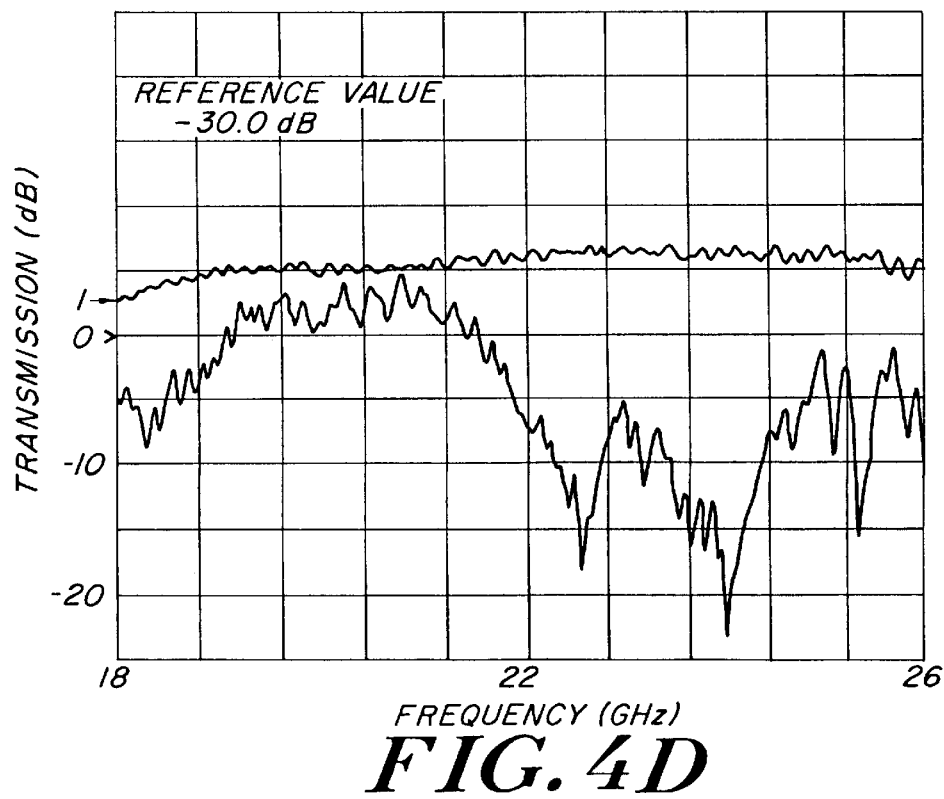

FIG. 3 is a schematic perspective exploded view of an exemplary embodiment 110 of the invention. In this embodiment, the structure 110 includes a plurality of sheets 112, 114, 116 of dielectric material stacked on top of one another. In this embodiment, the structure 110 comprises a plurality of sheets of the same or different dielectric materials stacked on top of one another. The dielectric materials are, for example, plastics, polymers, synthetic dielectrics such as Stycast® 12, or semiconductor materials. Each sheet 112, 114, 116 includes a plurality of cylindrical holes 120 through the sheet. The holes 120 are arranged in the two-dimensional periodic triangular lattice pattern described above. A conductive element such as a spherical metal ball 118 is placed in each hole 120 or a predetermined subset of the holes. The sheets 112, 114 and 116 of dielectric material are stacked on top of each other along the (111) direction in a staggered fashion with an ABC repeating unit to form the three-dimensional close-packed face-centered cubic (fcc) lattice of the high-conductivity metallic elements 118. The holes 120 and sheets 112, 114 and 116 are therefore positioned relative to each other such that the elements 118 are separated from each other and form the fcc lattice structure.

The close-packed condition for the fcc lattice results when the triangular lattice constant t is related to the sheet thickness s by $t=\sqrt{3/2}$ s. The fcc conventional cubic lattice constant a is then given by $a=\sqrt{2}$ t.

FIGS. 4A–4D and 5A–5D illustrate results of experiments performed on the three-dimensional photonic crystal structure of the invention in the embodiment of FIG. 3. The structure used for the experiments was made from three sheets of ¼ inch thick Stycast® 12 synthetic dielectric. The holes formed through the Stycast® were approximately ¼ inch in diameter and were arranged in the two-dimensional triangular lattice pattern having a lattice constant t of 7.8 mm or 0.306 inches. FIGS. 4A–4D and 5A–5D show the transmission characteristics of the structure in a frequency range between 2.0 and 26.0 GHz. FIGS. 4A–4D show the transmission characteristics without any metallic elements 118 in the holes 120. That is, the structure used to produce the results of FIGS. 4A–4D consisted only of three sheets of synthetic dielectric material with a three-dimensionally periodic pattern of cylindrical void regions in the material. FIGS. 5A–5D show the results with spherical high-conductivity metallic elements in each of the holes 120. The elements used were ¼ inch diameter "chrome steel balls" manufactured by McMaster-Carr of New Brunswick, N.J.

To produce the results of FIGS. 4A–4D and 5A–5D, the electromagnetic transmission through the two individual structures was measured from approximately 2 to 26 GHz with an HP8510 network analyzer. A set of four feed horns operating in S, C, X and K bands was used to transform the radiation from coaxial cable to free space and vice versa. The fcc photonic crystals were both placed between the feed horns with their front and back (111) facets, i.e., top or bottom layers, perpendicular to the beam propagation direction.

Referring to FIGS. 4A–4D, each plot compares the transmission characteristics of the photonic crystal (PC) with those of free space (air). It is noted that with no metallic elements present, there is insignificant difference in the transmission through the crystal and through free space between about 2 and 17 GHz. Between about 17 and 19 GHz there is shown a feature that has a maximum rejection of approximately 10 dB and a width of about 2 GHz. This is thought to be the photonic band gap or stop band of the three-dimensional periodic dielectric structure without metallic elements. This stop band is due to the well-known Bragg scattering effects found in purely dielectric photonic crystal structures. Above 19 GHz in the plot of FIG. 4D, there are three sharp features located at approximately 22.5, 24.0 and 25.4 GHz. All of these are believed to be associated with a higher band gap or band gaps in the dielectric photonic crystal.

Once again, FIGS. 5A–5D show the transmission characteristics for the photonic crystal structure of the invention with the metallic high-conductivity elements 118 inserted in the holes 120 of the Stycast® sheets. The plots compare the characteristics for the metallodielectric photonic crystal (MDPC) with those of free space (air). The most fundamental difference between FIGS. 4A–4D and 5A–5D is the significant rejection feature of the MDPC starting at about 3.2 GHz in FIG. 5A, extending up through C band and well into the X band data of FIG. 5C, and stopping at about 13 GHz.

Figure 5A:
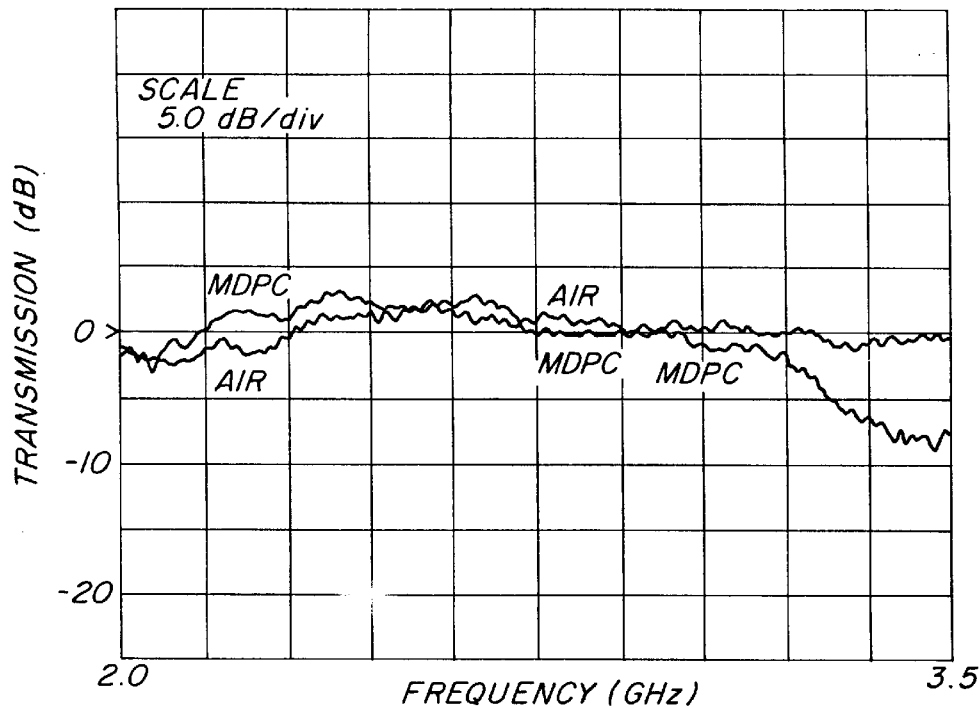
FIGS. 5A–5D are plots of the transmission characteristic of an embodiment of the face-centered cubic metallodielectric photonic crystal structure of the invention using the background material used for the plots of FIGS. 4A–4D.
Figure 5B:
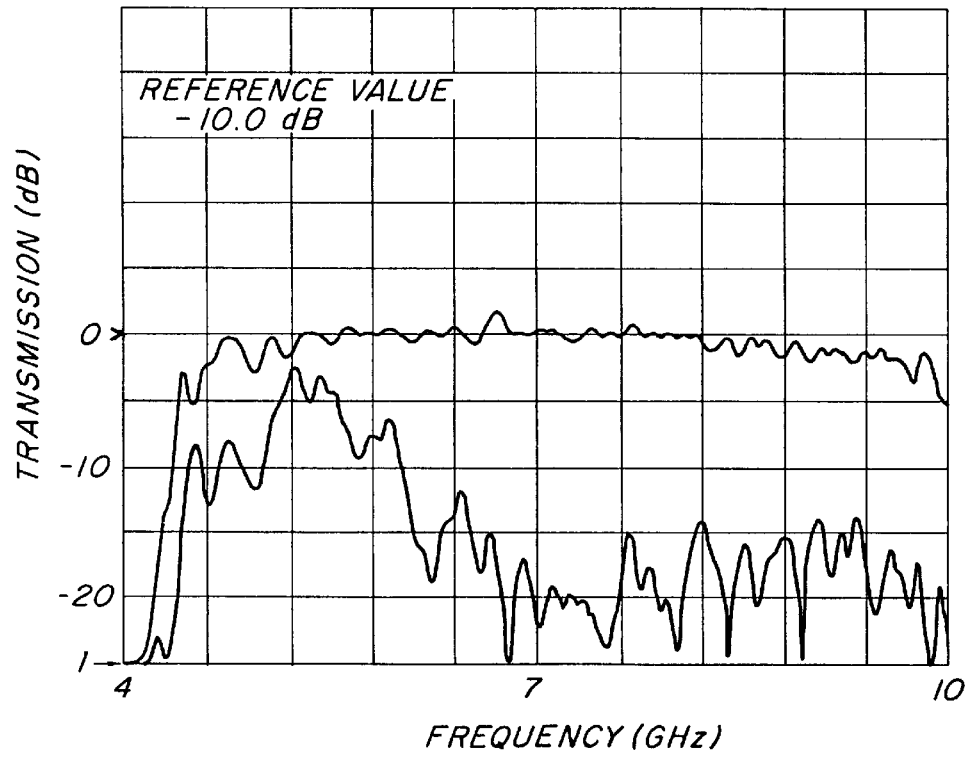
Figure 5C:
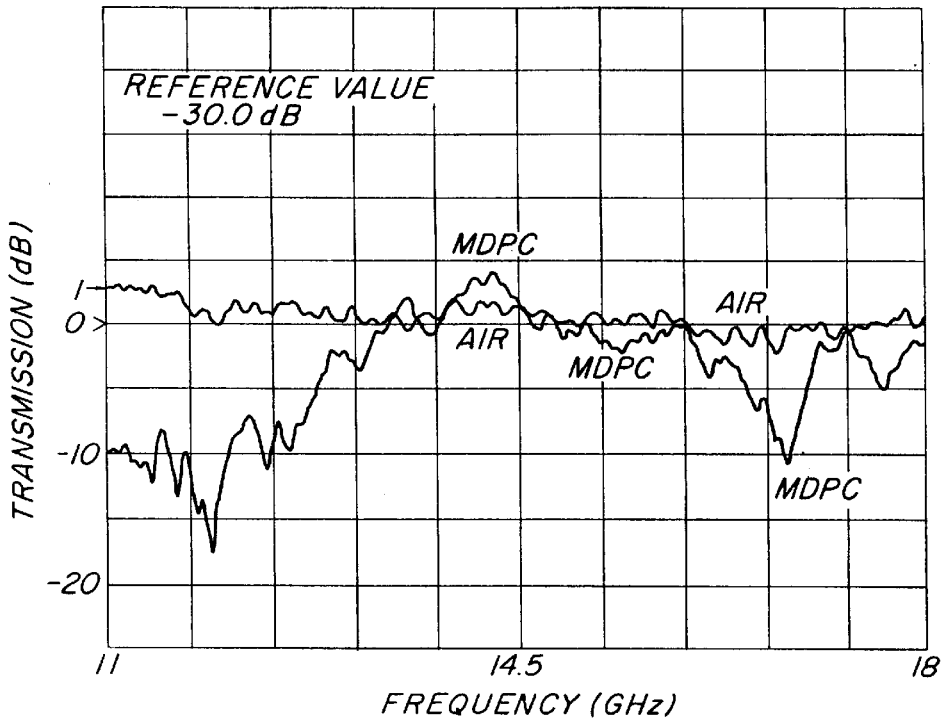
Figure 5D:
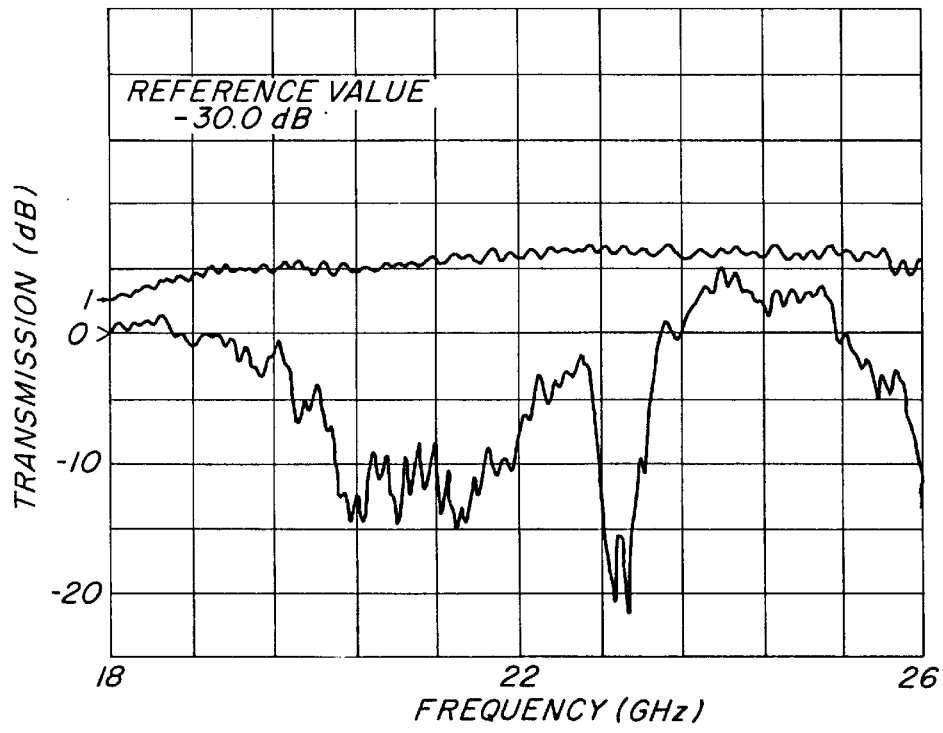

As shown in FIG. 5C, the MDPC also exhibits a narrow rejection feature of about 10 dB around 16.8 GHz. This is thought to correspond to the dielectric photonic band gap between 17 and 19 GHz in the dielectric photonic crystal shown in FIGS. 4C and 4D. In FIG. 5D, the MDPC of the invention shows further rejection features at about 21.0, 23.0 and 25.0 GHz. These are associated with the upper photonic stop bands shown for the dielectric photonic crystal in FIG. 4D.

The new rejection feature realized in the metallodielectric photonic crystal 110 of the invention is related to the difference in electromagnetic scattering between dielectric atoms of the prior art and the metallic atoms of the present invention. In the case of spherical atoms, it is known that both dielectric and metallic spheres exhibit little effect on electromagnetic radiation at wavelengths which are much greater than the diameter of the sphere. However, as the wavelength decreases, both types of spheres begin to scatter radiation much more efficiently. In fact, it is known that the scattering cross-section $\sigma$ varies with wavelength as $1/\lambda^4$. The work of Mie showed that at wavelengths just greater than the sphere diameter, most of the scattered radiation from dielectric spheres occurs in the forward direction. In contrast, at the same wavelength in metallic spheres, most of the scattering occurs in the reverse direction, even though there is a small Mie effect. The Mie effect is described in optics textbooks such as *Principles of Optics: Electromagnetic Theory of Propagation, Interference and Diffraction of Light*, Sixth (Corrected) Edition, pp. 632–659, by Max Born and Emil Wolf, published by Pergamon Press, which is incorporated herein by reference.

Another relevant result of Mie's work was that the scattering cross-section approaches a maximum when the wavelength satisfies the Mie relation $$\frac{\pi D n_e}{\lambda_o} = 1;$$

where D is the diameter of the sphere, $n_e$ is the effective index of refraction at the surface of the sphere, and $\lambda_o$ is the wavelength of the radiation in free space. In the examples described above, the lower edge of the stop band of the metallodielectric photonic crystal of the invention is in approximate agreement with the Mie relation.

Figure 6:
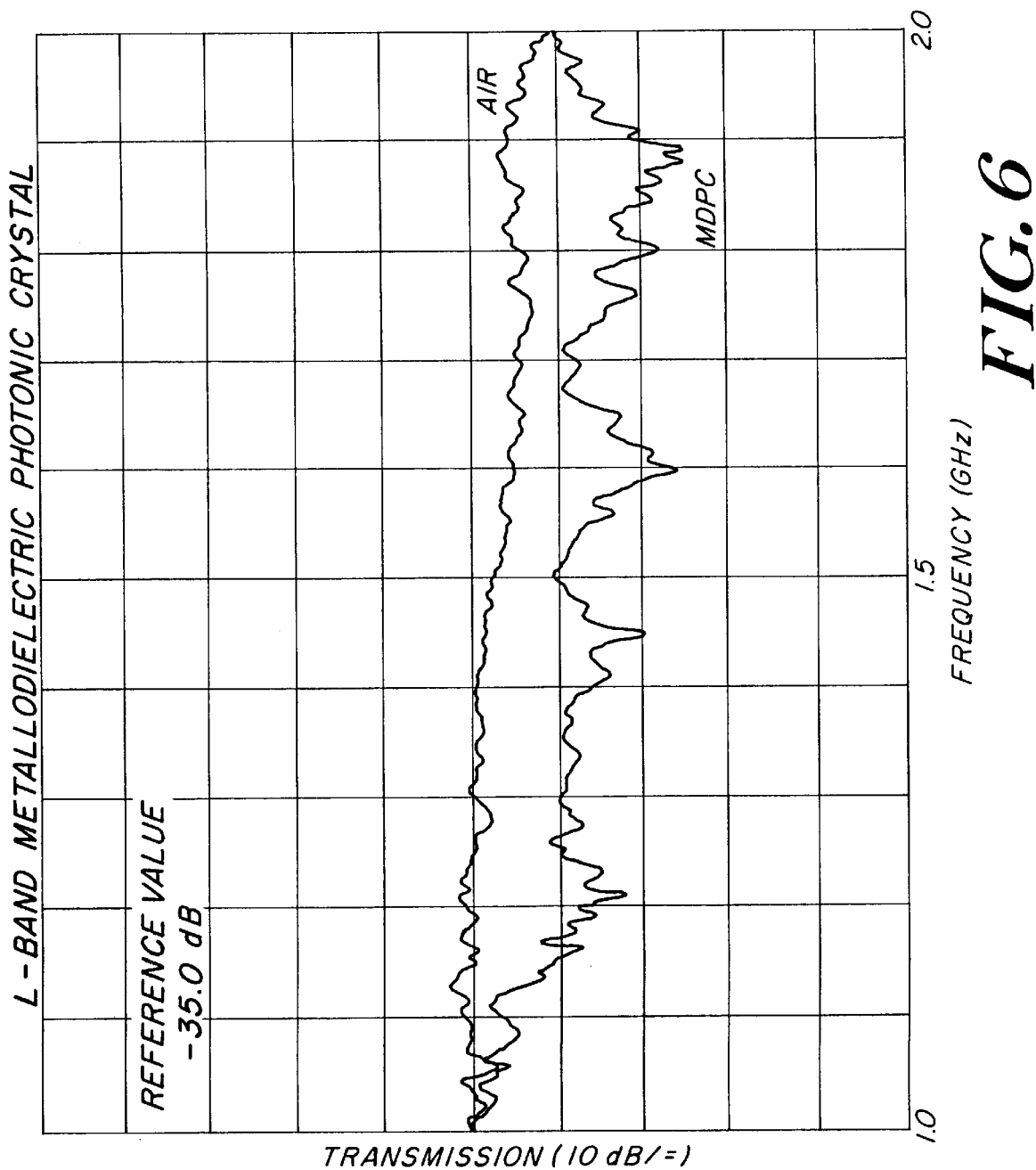
FIG. 6 is a plot of the transmission characteristic of the face-centered cubic embodiment of the metallodielectric photonic crystal of the invention having different geometric dimensions than the embodiment of FIG. 5.
Figure 7:
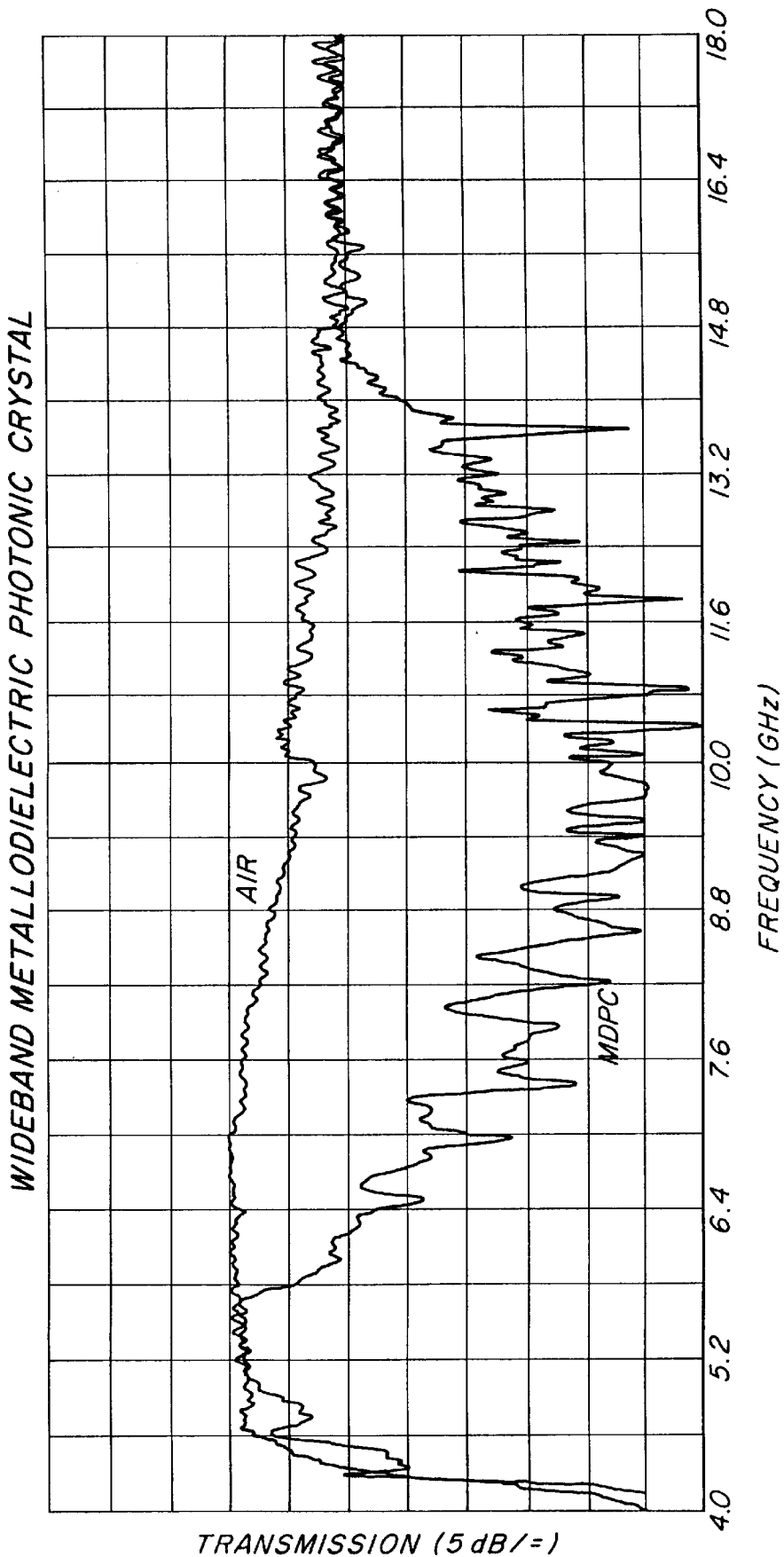
FIG. 7 is a plot of the transmission characteristic of the face-centered cubic embodiment of the metallodielectric photonic crystal of the invention having different geometric dimensions than the embodiment of FIG. 5.

Variations of the three-dimensional photonic crystal of the invention have also been fabricated and tested. FIGS. 6 and 7 show transmission characteristics of two such variations. FIG. 6 is the characteristic of an L-band metallodielectric photonic crystal. The device was made from three plates of synthetic dielectric Stycast® 12 which were each one foot square and one inch thick. The scattering elements were ¾ inch diameter carbon steel spherical balls. The transmission characteristic of FIG. 6 shows a stop band extending from approximately 1.0 to 2.0 GHz and having a maximum rejection of about 10 dB.

FIG. 7 shows the transmission characteristic of a structure in accordance with the invention made from three sheets of Teflon® ⅜ inch thick with ⅜ inch diameter carbon steel balls as the scattering elements. This structure exhibits a deep stop band extending from 5.8 to about 14.8 GHz and having a maximum rejection of about 25 dB around 10.0 GHz.

FIGS. 8A–8I illustrate the steps used to fabricate an integrated circuit embodiment 210 of the three-dimensional metallodielectric photonic crystal of the invention. In this embodiment, the photonic crystal structure 210 is fabricated using integrated circuit fabrication techniques. In the first step shown in FIG. 8A, a dielectric layer, such as a planarizing polymer film 212 of polyimide, is formed over a dielectric substrate 214. The substrate material depends upon the application in which the device is to be used. For example, where the eventual stop band is to be in the visible or near-infrared region out to wavelengths of approximately 3 $\mu$m, high quality glass or fused quartz can be used since they are transparent at those wavelengths, and they are also highly economical. In the infrared band between 3 and 5 82 m, sapphire or high-resistivity silicon are good choices. In the infrared band between 8 and 12 $\mu$m, high resistivity silicon or semi-insulating gallium arsenide would both be good choices. In other applications, where a flexible structure is desired, less rigid substrate materials would be better choices.

After the planarizing polymer film 212 is formed, a thin layer 216 made of a metal such as aluminum is formed over the polymer 212. As shown in FIG. 8B, a film of positive polarity photoresist 218 is then formed over the metal. Next, as shown in FIG. 8C, the photoresist 218 is masked, exposed and developed to form plural dots 219 of photoresist in the two-dimensional pattern desired for a single layer of metal elements. In the step shown in FIG. 8D, the metal layer 216 is etched by a known acid material. During the etching, the photoresist dots 219 mask the metal film 216. After the etching step, the photoresist dots 219 are stripped, leaving metal dots 220 in the two-dimensional pattern on top of the polymer layer 212.

Subsequent additional layers of patterned elements are then formed beginning with the formation of another polymer layer 222 and then another thin metal layer 224 as shown in FIG. 8E. In the next step shown in FIG. 8F, a second layer of metal dots 226 is formed over the polymer layer 222. The second metal film layer 224 is patterned in such a way that the resulting dots 226 are offset in a precise manner with respect to the dots 220 in the layer immediately below, dictated by the desired final three-dimensional structure. For example, if the dots in each layer are patterned in a triangular lattice and layers are offset in a double close-packed fashion, a face-centered cubic lattice results as in the structure described above.

Figure 8G:
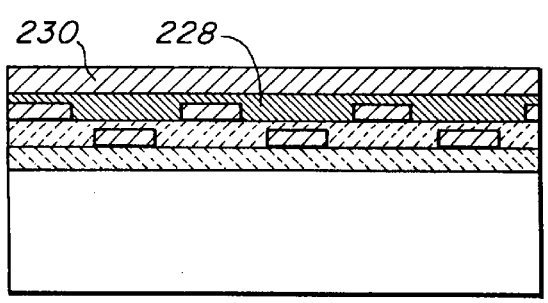
Figure 8H:
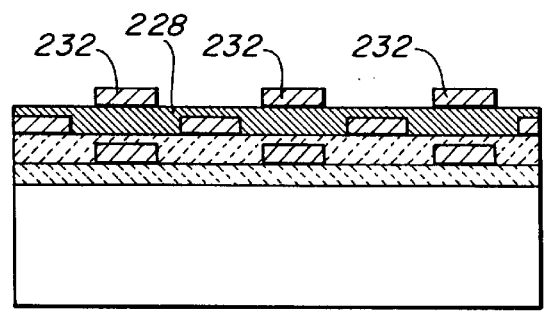
Figure 8I:
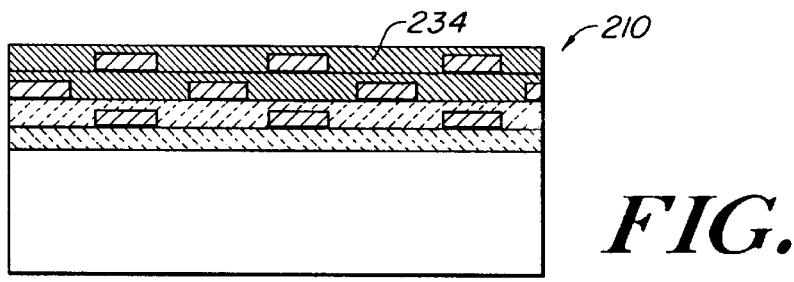

The process repeats again beginning at the step shown in FIG. 8G in which a third planarizing polymer film 228 is formed over the dots 226, which is followed by a third thin metal film 230. Once again, as shown in FIG. 8H, a series of metal dots 232 is formed as desired by photolithographic techniques over the polymer film 228. Finally, as shown in FIG. 8I a layer of insulating polymer 234 is formed over the dots 232 as a capping layer to insulate the structure 210.

The finished three-dimensionally periodic structure 210 is used as described above to produce a photonic band gap defining frequencies which are reflected by the structure 210. It should be noted that FIGS. 8A–8I are schematic only. They are intended to represent the steps required to form the metallodielectric photonic crystal by integrated circuit fabrication techniques. The particular patterns of metal dots shown do not represent any particular crystal lattice structure. It will be understood that the pattern of dots formed at each layer can be altered and controlled as desired to produce any final three-dimensionally periodic lattice structure.

The structure 210 described in connection with FIGS. 8A–8I allows the metallodielectric photonic crystal to be fabricated on very small scales. As such it is applicable to devices operating in the near-infrared or visible wavelengths as a substrate on which these devices can be isolated from each other. It can also be used as a substrate for planar antennas fabricated by integrated circuit techniques. Also, with a flexible substrate, the structure can be applied as a frequency selective coating to prevent emissions or transmissions of certain wavelengths of radiation. One particular commercial application for it is as a coating for building windows to prevent heat from escaping buildings in the form of infrared radiation.

One of the exemplary embodiments of the aforementioned MDPC utilizes highly-reflecting metallic spheres embedded in a lossless dielectric material. Because of their large imagenary dielectric component, the metallic cores reflect radiation very efficiently and give rise to large band gaps along certain directions in space. In fact, as will be described hereinafter, the MDPC exhibits a large photonic band gap along the (111) direction of the fcc structure.

The use of metals or non-dielectric materials in photonic crystals offers new challenges for the theoretical investigations of photonic band gaps. Among several conventional approaches, three-dimensional calculations concentrate only on structures with spatial periods comparable to the plasma wavelength, which usually lies in the ultraviolet regions. In this frequency range, dispersion and absorption effects must be taken into account in order to obtain the correct electromagnetic response. Motivated by the recent advancements with respect to the invention, however, it is desirable to investigate the existence of photonic band gaps in metallodielectric structures in the microwave region, which is several orders of magnitude lower than the plasma frequency. In this region metals are essentially lossless and can be accurately modeled as perfectly electrical conductors.

Accordingly, relatively simple schemes based on finite-difference time-domain methods (FDTD) are applied to calculate both the photonic bands and the associated field distribution of perfect crystals. The FDTD methods are also used to obtain transmission spectra through finite-thickness samples in order to make direct comparisons with experiments. After a brief description of the computational methods, results for a variety of fcc and diamond crystals will be presented in accordance with the present invention. While attention will focus on the fcc and diamond structures, it will be appreciated by those of skill in the art that it is possible for other crystal structures to generate bandgaps.

Finite-difference time-domain methods are commonly used in analyzing interactions between electromagnetic waves and complex structures containing dielectric and/or metallic objects. The general procedure involves approximating Maxwell's equations in real space using finite differences, imposing appropriate boundary conditions, and explicitly time-marching the fields to obtain the direct time-domain response, from which a wide variety of information can be extracted.

For simplicity, Yee's discretization scheme is used as described in K. S. Yee, *Numerical Solution of Initial Boundary Value Problems Involving Maxwell's Equations in Isotropic Media*, IEEE Trans. on Antennas and Propagat., vol. AP-14, no. 3, 302 (1966), which is incorporated herein by reference. All field variables are defined on a rectangular grid. Electric and magnetic fields are temporally separated by one-half time step. In addition, they are spatially interlaced by half a grid cell. Based on this scheme, center differences in both space and time are applied to approximate the Maxwell equations. Since all grid cells are rectangular in shape, arbitrary geometries are approximated by staircases. The validity and limitations of staircase approximations are discussed in A. C. Cangellaris et al., *Analysis of the Numerical Error Caused by the Stair-Stepped Approximation of a Conducting Boundary in FDTD Simulations of Electromagnetic Phenomena*, IEEE Trans. Antennas Propagat., vol. 39, no. 10, 1518 (1991), which is incorporated herein by reference. Inside the metallic objects, all electrical field components are set to zero at each time step to impose the correct boundary condition at the metal-dielectric interface.

In order to compute the field at any given grid point, the value of the field at every adjacent point on the grid must be known. With a finite computational cell, information from nodes outside the cell is not available. Fields at the nodes on the boundaries, therefore, have to be updated using boundary conditions. Depending on the purpose of the simulation, either absorbing or periodic boundary conditions are applied. This and other aspects of the computational methods specific to either transmission or bandstructure calculations are discussed hereinafter.

Figure 9:
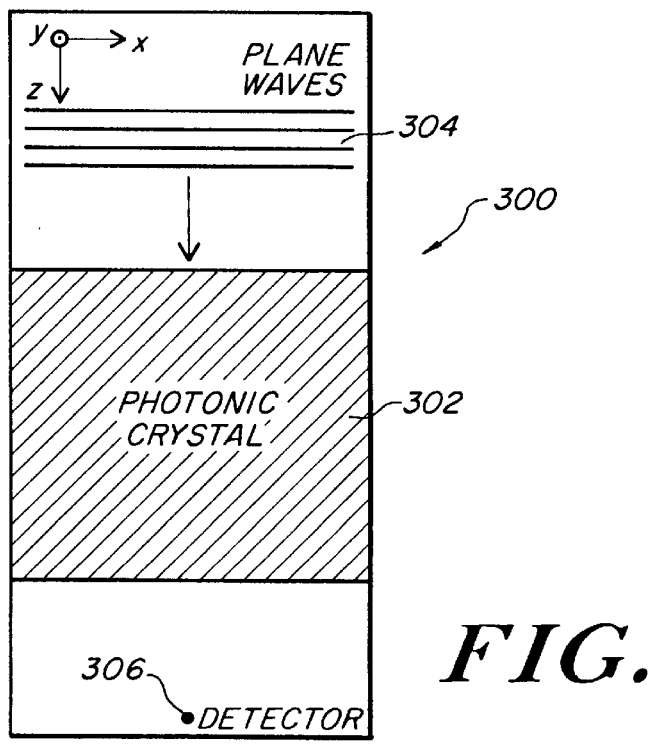
FIG. 9 is a schematic of an exemplary computational cell used in transmission calculations.

While the methods described above can be applied to study propagation of electromagnetic waves in arbitrary structures, the primary concern is with transmission of normally incident plane waves through a slab of photonic crystals, since the transmission can be directly measured by experiments. A schematic of an exemplary computational cell 300 is shown in FIG. 9. A slab of photonic crystal 302 is placed in the middle of the cell with its surfaces normal to the z-direction. Plane waves 304 propagating along the z-axis are generated by exciting a plane of identical dipoles in phase. On the other side of the crystal, the field amplitude is monitored at a single point with a detector 306.

On the top and bottom surfaces, Mur's second-order absorbing boundary conditions are applied as described in G. Mur, *Absorbing Boundary Conditions for the Finite-Difference Approximation of the Time-Domain Electromagnetic-Field Equations*, IEEE Trans. Electromagn. Compat., EMC-23, 377 (1981), incorporated herein by reference. Plane waves hitting the top and bottom boundaries are absorbed by the boundaries. On all other boundaries, periodic boundary conditions are used. By placing one unit cell of a slab on photonic crystal in the computational domain, plane wave normally incident upon a slab with infinite extent in the xy-directions can be simulated.

Instead of studying the steady state response, one frequency at a time, a single pulse of light is sent with a wide frequency profile. The incident amplitude is calibrated at the detector point by running a simulation without the crystal. Simulations are then performed with the crystal present, the amplitude at the detector now describing the transmitted wave. The transmitted and incident amplitudes are then transformed into the frequency domain using fast Fourier transformations. The transmission coefficients are determined by taking the square of the ratio between the two amplitudes.

Time domain simulations can also be used to obtain bandstructure information. The computational domain is chosen to be a unit cell of the infinite crystal. Fields at nodes outside the domain are related to fields inside by Bloch's condition:

$$\overline{E}(\overline{r}+\overline{a},\ t)=e^{i\overline{k}\cdot\overline{a}}\overline{E}(\overline{r},\ t) \qquad (1)$$

where $\overline{r}$ is the position vector of a node in the domain, $\overline{a}$ is a lattice vector, and $\overline{k}$ is the wavevector. After the initial excitation, fields oscillate in a steady state which is a linear combination of several eigenstates with the same wavevector $\overline{k}$. Frequencies of these eigenstates can be obtained by a Fourier transformation of the time-domain amplitude at a given point. The resulting spectrum is composed of a discrete set of peaks, where each peak corresponds to an eigen-frequency. Similar methods have been used in determining phonon dispersion in semiconductors, and in calculating various electromagnetic wave properties in ordered and disordered dielectric structures as described in Arias et al., *Ab initio molecular-dynamics techniques extended to large-length-scale systems*, Phys. Rev. B, vol. 45, no. 4, 1538 (1992) and Chan et al., *Order-N spectral method for electromagnetic waves*, Phys. Rev. B, vol. 51, no. 23, 16635 (1995), both of which are incorporated herein by reference.

Modes in the computational cell 300 are excited using one or several point dipole sources with Gaussian frequency-profiles amplitudes. The oscillation period and the width of the Gaussian are chosen such that the excitation spectrum covers the frequency range of interest. In determining the bandstructure, a short pulse in time is used which excites a wide frequency range. Both dipoles and the point where the field is recorded are placed away from all the symmetry planes, so that modes with different symmetries can be excited and recorded in one simulation. Instead of exciting several modes simultaneously using a pulse with a wide spectral range, a narrow source (i.e. long duration in time) is also used to selectively excite only one eigenstate at a specific frequency. The symmetry of the steady state can further be specified by placing the dipoles in appropriate symmetrical configurations.

As discretization is performed on a rectangular lattice, a natural choice for the computational domain is rectangular. For fcc lattices, a cubic unit is employed, which contains four fcc primitive cells. As equation (1) only determines the phase relations between different cubic cells, the bandstructure obtained is a folded version for the underlying fcc lattice. To obtain unfolded bandstructures, the phase relation across different primitive cells needs to be specified. This is achieved by placing a dipole in each of the four primitive cells. The dipoles are separated by an fcc lattice vector, the relative phase between them satisfying Bloch's theorem.

Convergence of the methods is studied by comparing the size of the gap for a given structure with the different density of grid points. Detailed convergence study and specific examples of the methods are presented hereinafter.

In order to validate the previously described computational method, an experimentally demonstrated device such as the fcc structure shown in FIGS. 1–3 is initially investigated. In this specific exemplary embodiment, the experimental structure includes stacked layers of Teflon® ($\epsilon$=2.1).

Figure 10:
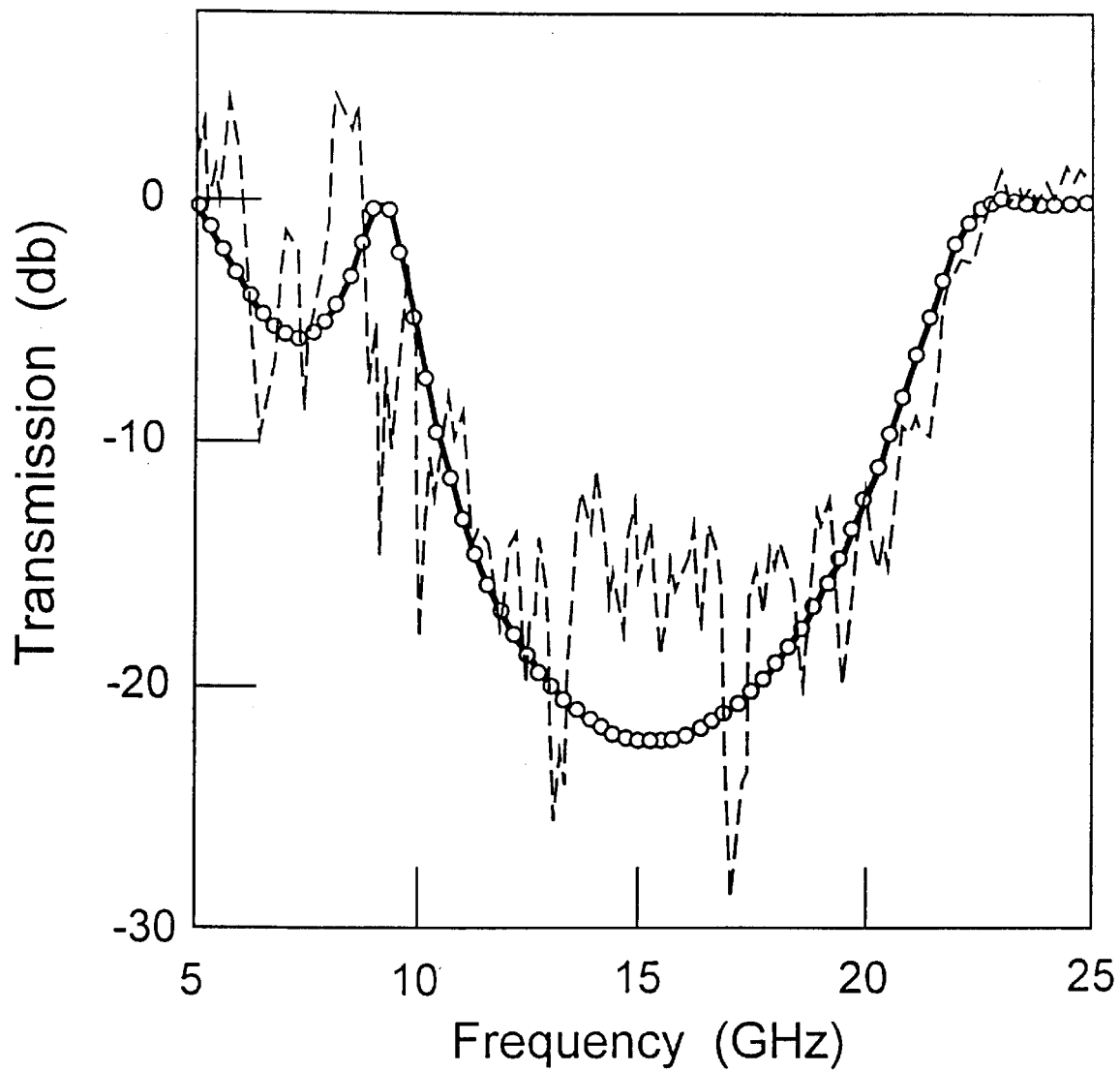
FIG. 10 is a plot of transmission spectra (theoretical and experimental) through a slab of a face-centered cubic metallodielectric photonic crystal in accordance with the invention.

Transmission coefficients of normally incident plane waves through a crystal that contains one ABC repeating unit are calculated. The transmission vs. frequency plot of FIG. 10 shows how the results compare to experimental data, which were obtained using a cubic unit cell size of 0.43 inch. The solid line is obtained from theoretical calculation, with the open circles being data points. The dashed line corresponds to the experimental results. The simulations show the existence of a large gap extending from 9 GHz to 23 GHz with a maximum rejection of 22 dB, and the occurrence of a smaller gap between 5 GHz and 9 GHz, all in excellent agreement with experiment.

Figure 11A:
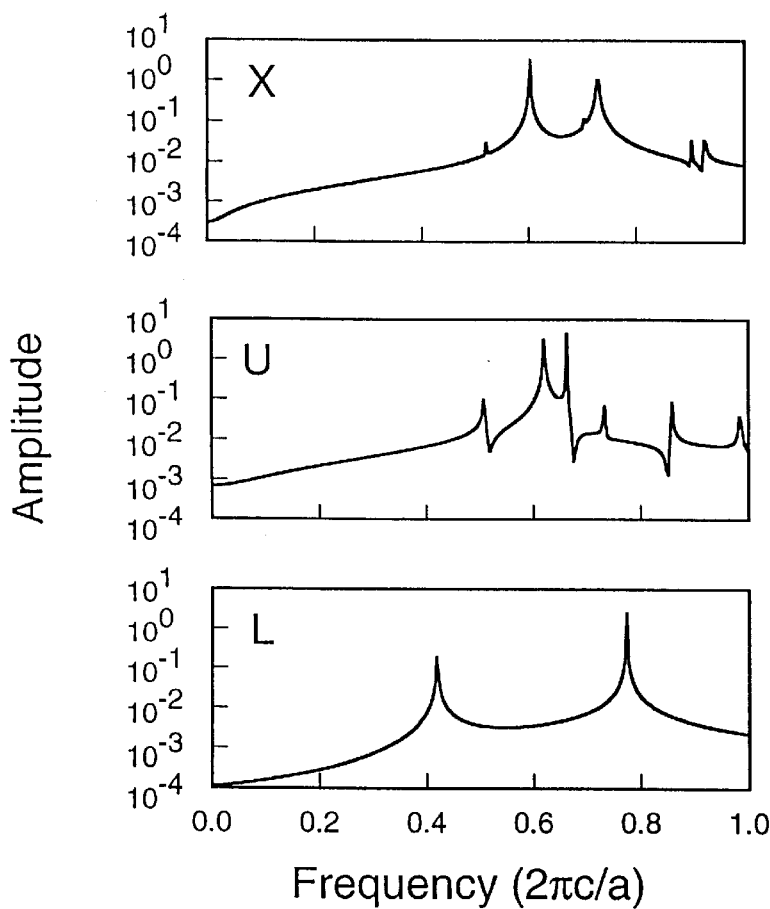
FIGS. 11A and 11B respectively are plots of spectral amplitude for the face-centered cubic metallodielectric photonic crystal of the invention, and frequency bands for the same face-centered cubic structure.

The band structure is computed for the crystal using the band structure calculation method described above. An exemplary 32×32×32 cell is used for the calculation. The bandstructure plot is obtained by analyzing the spectrum for each k-point. The spectra at Γ, L and X are shown in FIG. 11A as examples. FIG. 11A shows plots of spectral amplitude at several k-points for the fcc MDPC. The bandstructure is plotted in FIG. 11B, with the wavevector at the L-point parallel to the axis of the air cylinders. Each dot corresponds to a peak in the spectral amplitude at a specific k-point. A large gap exists along this direction between the frequencies f=0.42 c/a and f=0.77 c/a. In the specific case where the lattice constant a is equal to 0.43 inch, the gap occurs between 11.5 GHz and 21.2 GHz, in agreement again with the transmission experiments.

Figure 11B:
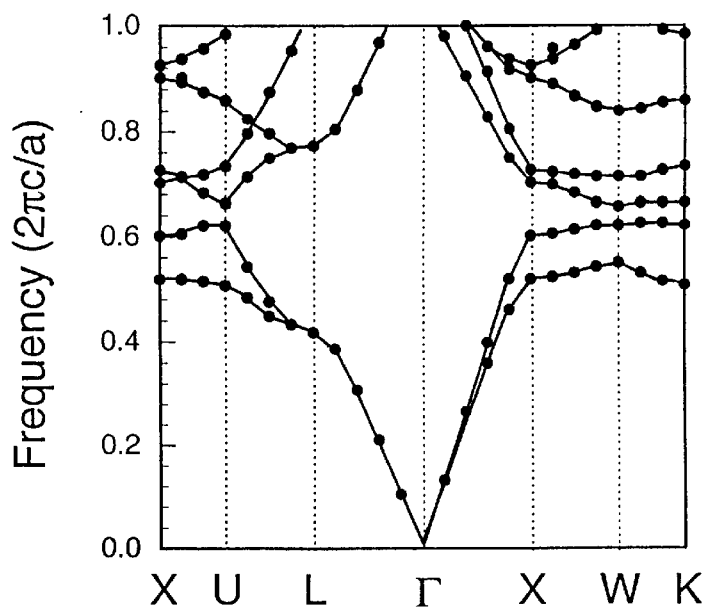
Figure 11B:
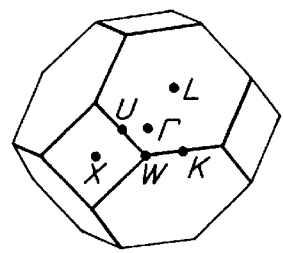

The small discrepancy between the frequencies at the edges of the gap arises from the finite size of the experimental sample. The maxima in the transmission spectrum at the edges of the gap do not correspond exactly with the position of the band edges for the infinite crystal. The smaller gap at lower frequencies finds no corresponding gap in the band structure in the infinite crystal. This is likely due to a Fabry-Perot oscillation in the finite-size sample. FIG. 11B clearly shows that there is no omnidirectional gap for this crystal. The gap along the L direction does not extend to the directions of U and W. The fcc structure exhibits a large photonic band gap along the (111) direction.

Figure 12:
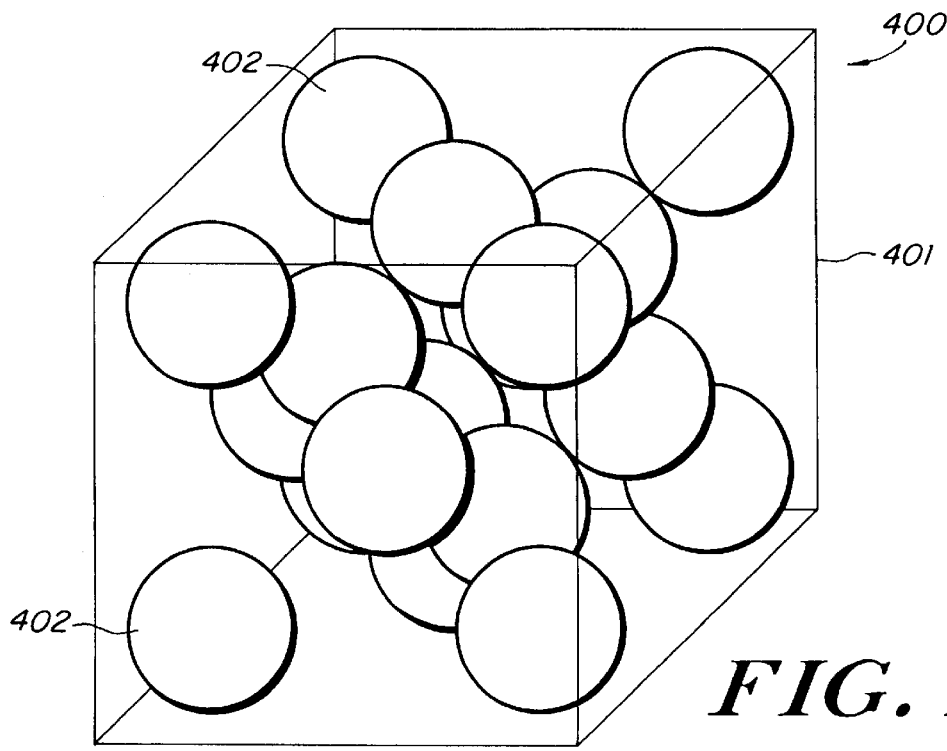
FIG. 12 is a schematic perspective view of the three-dimensional metallodielectric photonic crystal of the invention configured in a diamond lattice.

In accordance with an exemplary embodiment of the invention, a MDPC 400 having a diamond lattice structure exhibits an omnidirectional band gap as shown schematically in FIG. 12. The MDPC 400 includes a periodic array of elements 402 which are conductive or have non-dielectric components, arranged in a diamond lattice. FIG. 12 shows one unit cell 401 of the diamond lattice, in the specific case where the elements are metallic spheres. There is a total of eight spheres in the unit cell. The spheres are supported in place by one or more dielectric materials.

The radius of the illustrated spheres can be varied to tune the photonic bands. The spheres do not overlap with each other if the radius is smaller than 0.2165 a, where a is the size of the cubic unit cell. Attention is focused on non-overlapping spheres, or arrangements in which the conductive or non-dielectric components of the elements are spatially isolated from one another, as such structures prevent long-range conduction currents. For arrangements in which the conductive or non-dielectric components of the elements are not spatially isolated from one another, the gap will open between 0 and the first band, instead of between the second and third bands.

The different parameters of the diamond lattice structure are (i) the shape and size of the elements 402, (ii) the absorption coefficient of the elements, and (iii) the index of refraction of the dielectric material(s). In the examples provided hereinafter, only the results for metallic spheres made of perfect metals with zero absorption are shown for exemplary purposes. It will be appreciated by those of skill in the art that the MDPC can be configured with elements of different shapes, such as discs or cubes, or of different conductive or non-dielectric materials.

In an exemplary embodiment of the invention, the MDPC 400 includes metallic spheres having a radius 0.21 a, where a is the lattice constant of the diamond structure. In the exemplary case, the spheres are almost touching. The spheres are embedded in a material with a dielectric constant of 2.1, such as Teflon®.

Figure 13A:
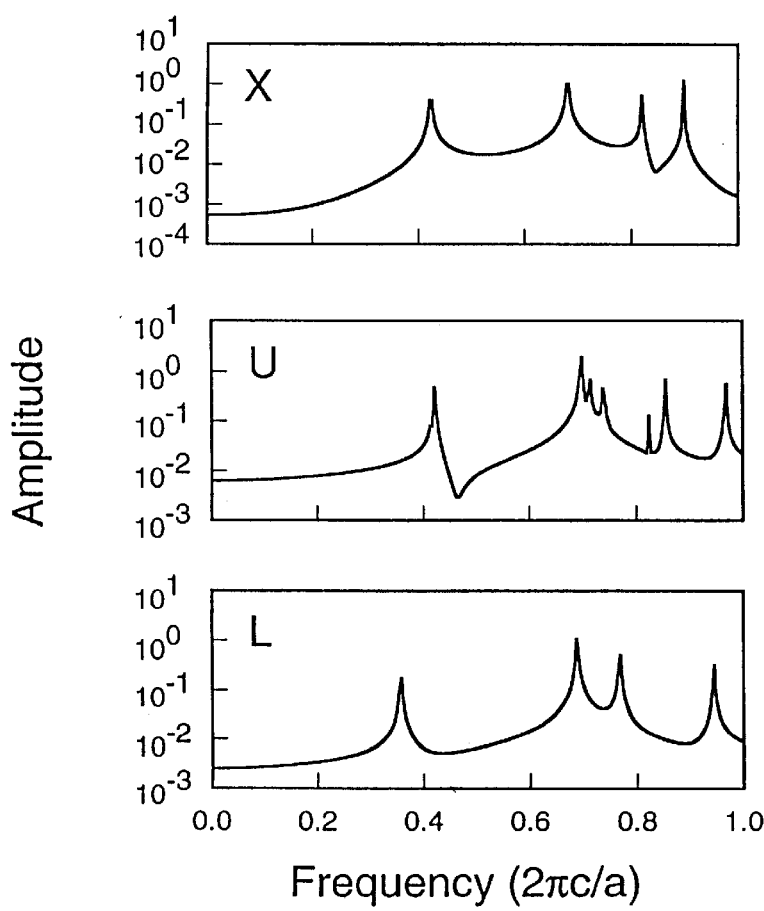
FIGS. 13A and 13B respectively are plots of spectral amplitude for the diamond lattice metallodielectric photonic crystal of the invention, and frequency bands for the same diamond lattice structure.
Figure 13B:
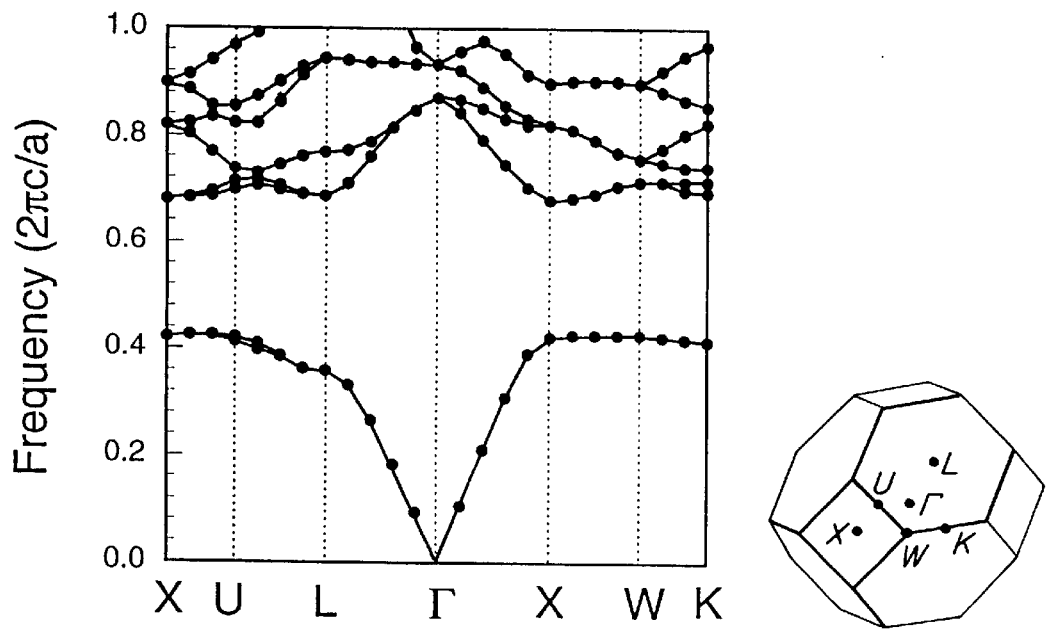

In order to determine the existence of a band gap, the allowed modes in the structure are computed along various directions in the Brillouin zone and using a 64×64×64 grid. The frequencies of the allowed modes are plotted in FIGS. 13A and 13B as a function of the amplitude and wavevector, respectively. FIG. 13A shows plots of spectral amplitude at several k-points for the diamond structure of metallic spheres with r=0.21 a. The spheres are embedded in Teflon® ($\epsilon$=2.1). FIG. 13B shows a band diagram for the same diamond structure. Each dot corresponds to a peak in the spectral amplitude at a specific wavevector.

The frequency is normalized with respect to c/a, where c is the speed of light in vacuum. The size of the structure can be scaled to any wavelength simply by scaling a.

There exists a full photonic band gap in which electromagnetic waves are forbidden to propagate in any direction. The lower edge of the gap is located at the W-point of the second band and the upper edge is located at the X-point of the third band. The gap covers the frequency range between 0.43 c/a and 0.68 c/a. The lower band is almost entirely flat along the W-X and the X-U lines on the surface of the first Brillouin zone. The size of the gap, defined as the gap width to midgap frequency ratio ($\delta\omega/\omega_g$), exceeds 45% which is significantly larger than the biggest gap ever reported in conventional all-dielectric photonic crystals.

In the exemplary MDPC 400, the metallic spheres form impenetrable cores for electromagnetic waves. The field amplitudes for both the upper and the lower bands therefore are entirely distributed in the uniform dielectric. This behavior is in sharp contrast to conventional all-dielectric photonic crystals. In conventional crystals, the gap originates from the difference in field distribution between a low-frequency "dielectric" band, which has most of its displacement field concentrated in the high-dielectric region, and a high-frequency "air" band, which has its field penetrating more into the low-dielectric.

Figure 14A:
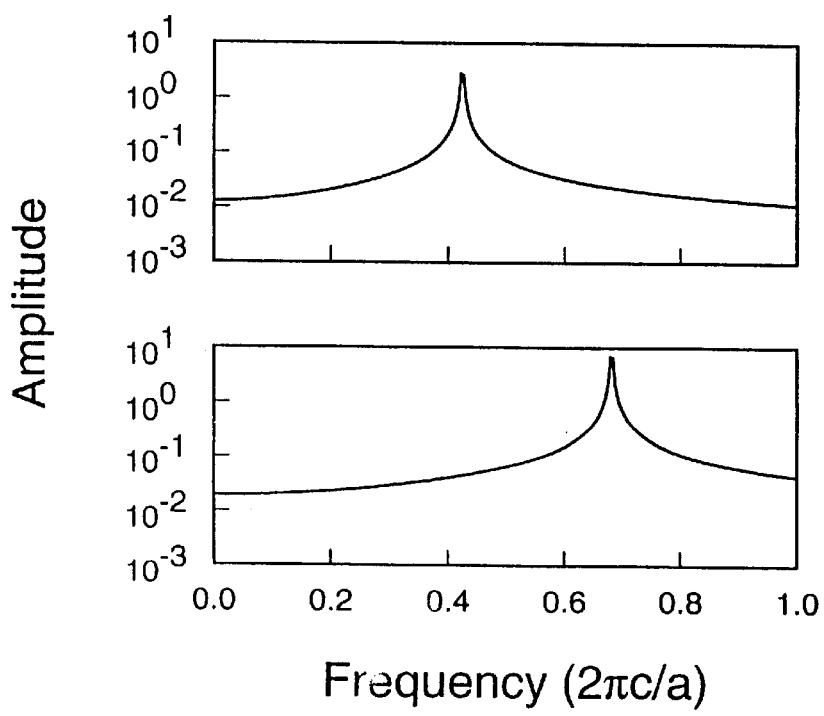
FIGS. 14A and 14B are respective plots of spectral amplitude of the field distribution of two eigenstates in the diamond structure, and of the power density in the magnetic field on the (110) plane of the structure.

To probe into the origin of the gap in metallodielectric systems, the field distributions of the normal modes at the X-point in the lower and upper bands are studied. Each eigenmode is selectively excited by using sources with a narrow spectral width, performed by oscillating the dipole sources at a given frequency for a long duration. The spectral amplitude of the resulting states are shown in FIG. 14A. Each spectrum contains only one peak, indicating the presence of a single eigenstate. The cross section of the power density in the magnetic fields is shown along the (110) plane in FIG. 14B, for both the lower and the upper bands. In the lower band, the field is extended throughout the open region in the lattice, while in the upper band, the field is mostly localized at the narrow region between the nearest neighbor metal spheres.

The large frequency difference between the two modes can be explained using the variational theorem in electromagnetism, as described in J. D. Joannopoulos et al., *Photonic Crystals, Molding the Flow of Light*, (Princeton University, Princeton, 1995), incorporated herein by reference.

The following equation links the mode frequency with the spatial variation in the magnetic field distribution:

$$\omega^2 = \frac{\int d\vec{r} \frac{1}{\varepsilon} (\nabla \times \vec{H})^2}{\int d\vec{r} \vec{H}^2} \quad (2)$$

The band associated with the more extended magnetic field has a lower frequency, while the band with the more localized magnetic field has a higher frequency. The origin of the large gap is thus related to the sharp contrast in the spatial variation of the field distribution.

The convergence of the method is studied by calculating the size of the gap at the X-point using four different grid spacings ($\delta$s): 1/32 a, 1/64 a, 1/96 a, and 1/128 a. The calculations are performed on four structures with different radii and the results are plotted in FIG. 15. For each structure the size of the gap increases with the grid density, however, the rate of convergence decreases as the spheres become closer to touching.

The convergence behavior is related to the field distribution of the eigenmodes, which has significant components in the area between the spheres. An accurate sampling of the fields in this region is important in order to obtain the precise frequency value and the gap size. This region, however, becomes smaller as the radius of the spheres increases, requiring higher density of grid points for adequate sampling.

Figure 15:
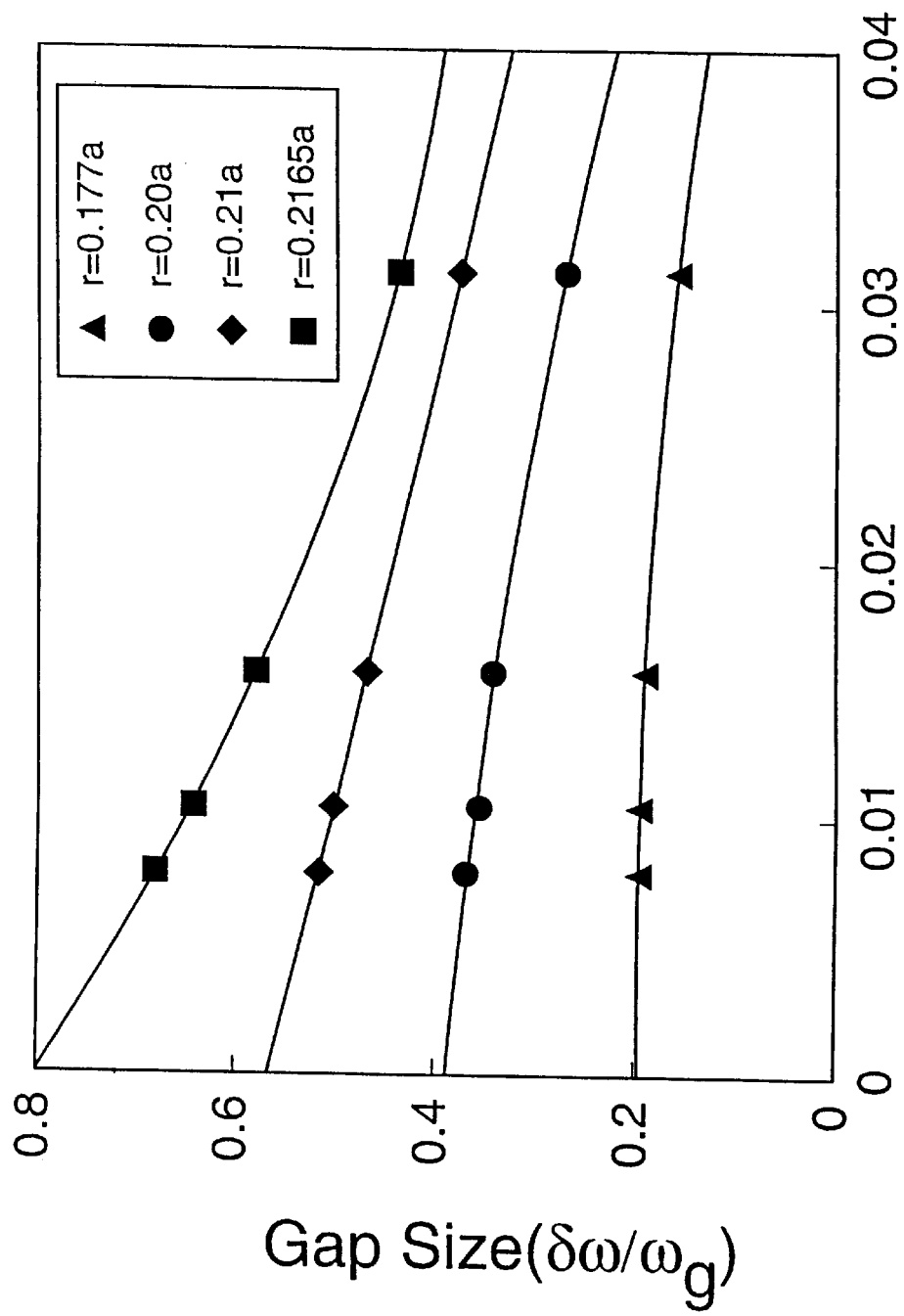
FIG. 15 is a plot of the size of the gap for the diamond structure for various grid spacings.

In using a finite-difference scheme to solve Maxwell's equations, two types of errors occur. One type is caused by approximating the curls of the fields with a centered difference on the grid, while the other type comes from the staircase approximation for the metallic structure. In the first case the error scales as $\delta s^2$, where $\delta s^2$ is the grid spacing. In the second case, the error originates from the uncertainty in representing the size of the air region between the nearest neighbor spheres, which scales as $\delta s$. Consequently, the inaccuracy in the frequency or the gap size also scales as $\delta s$. The overall error in computing the size of the gap is a combination of both errors. The size of the gap, therefore, can be determined for each individual structure by fitting the results on a second-order polynomial with argument $\delta s$, and by extrapolating it to the limit where $\delta s/a \rightarrow 0$, as shown in FIG. 15. The size of the gap at the X-point as a function of grid spacing for four structures with r=0.177 a, 0.20 a, 0.21 a and 0.2165 a.

A systematic examination is made of the photonic band structure as a function of the radius of the spheres. Calculations are performed using four different grid spacing and the results are plotted in FIG. 15. The extrapolated gap size for each structure is also shown. The gap increases rapidly as the spheres become larger and can be much greater than 60% when the radius exceeds 0.21 a.

One possible approach for fabricating a diamond lattice MDPC in accordance with the invention is to stack dielectric slabs, as proposed for the fcc structure in accordance with FIG. 3. As an example, assume Teflon® slabs with $\epsilon$=2.1. A square lattice of cylindrical air holes with a lattice constant of 0.70 a can then be drilled on each side of the slab to contain the metallic spheres. The holes on either side of the slab are shifted by 0.35 a with respect to each other. Each slab has a thickness of 0.25 a. The holes have a diameter of 0.42 a and a depth of 0.21 a. The holes on either side intersect each other. Each hole on one side of the slab is half-filled with a metallic sphere of radius 0.21 a. The slabs are then stacked along the (100) direction in an ABCD staggered fashion so that the spheres extending beyond the surface of any given slab coincides with the holes at the bottom of the slab above. Such an arrangement of spheres produces a diamond lattice. The final step of the fabrication process would consist in covering the upper and the lower surface with a slab that is half as thick as the other slabs, having an array of holes on only one side.

Figure 16A:
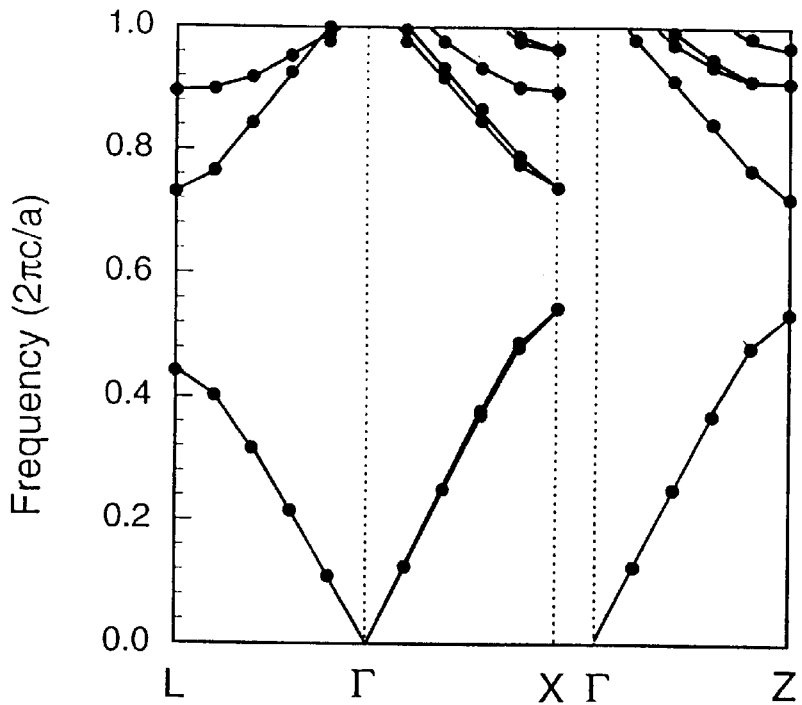
FIGS. 16A and 16B are respective plots of the band diagram and the transmission characteristics for a diamond structure of metallic spheres with radius r=0.21 a embedded in a dielectric.
Figure 16B:
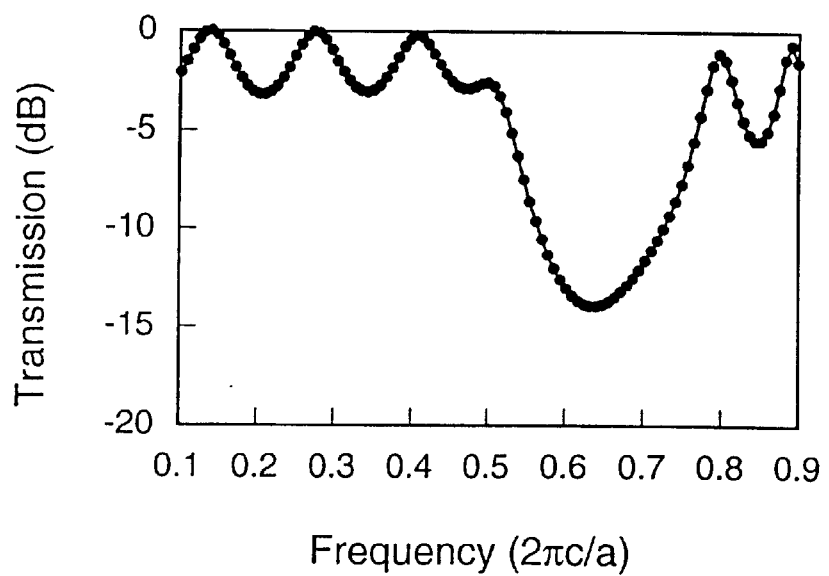

FIGS. 16A and 16B show transmission and band diagrams for a diamond structure of metallic spheres with radius r=0.21 a embedded in Teflon® ($\epsilon$=2.1) The spheres are surrounded by air cylinders. Photonic bands along directions $\Gamma$-L, $\Gamma$-X and $\Gamma$-Z are shown in FIG. 16A. The degeneracy between the X- and Z-points is broken by the presence of the air cylinders. The wavevector at the Z-point is normal to the slab. The gap at Z extends from frequency f=0.54 c/a to f=0.72 c/a, which yields a gap of 28.5%. The transmission normal to the slab through two cubic unit cells is shown in FIG. 16B. The maximum rejection is 14 dB, or 7 dB per lattice constant, occurring at a frequency of 0.64 c/a, which is close to the midgap frequency.

Figure 14B:
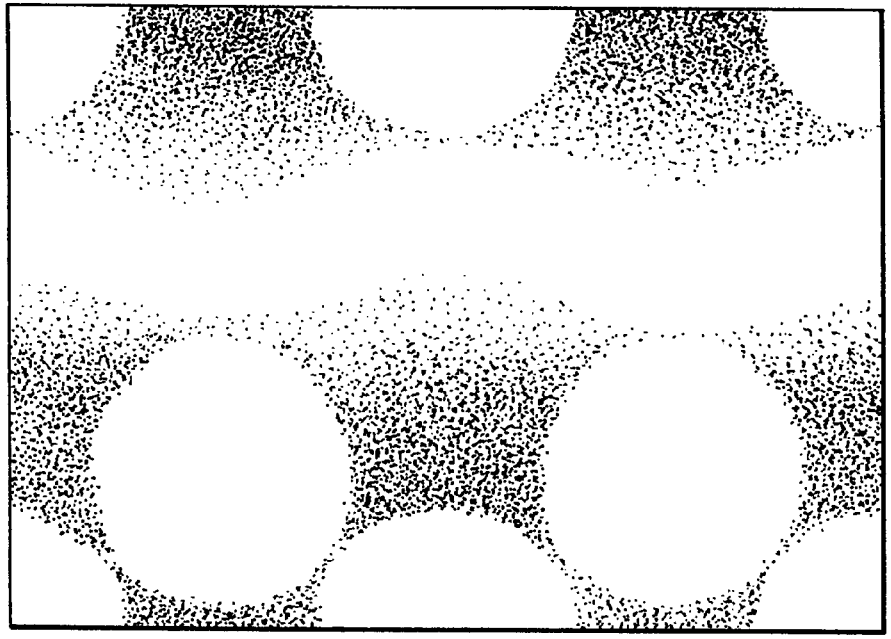
Figure 14B:
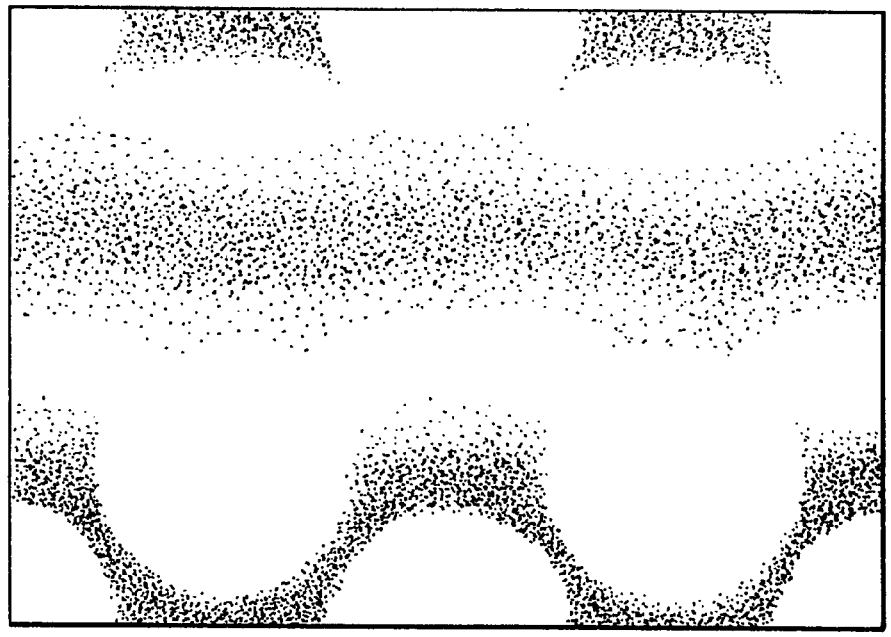
Figure 14B:

In order to prevent the nearest neighbor spheres from touching, it is possible to fill the air voids in the cylinders with resin. Since resin is of higher dielectric constant ($\epsilon$=2.5), the frequencies decrease in both the upper and lower bands. The lower band, however, is affected more strongly sine the associated electrical fields are concentrated between the spheres. The magnetic field distribution is shown in FIG. 14B. The magnetic fields associated with the lower band at the Z-point are extended throughout the open region. In contrast, the electrical fields corresponding to the same band are concentrated in the region between the spheres. The electrical fields associated with the upper band are distributed throughout the open region.

Figure 17A:
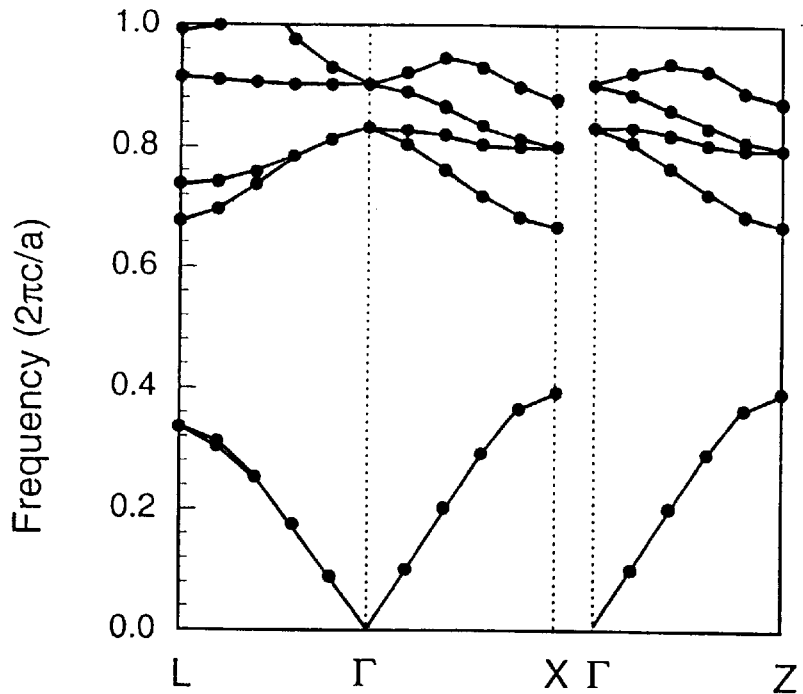
FIGS. 17A and 17B are respective plots of the band diagram and the transmission characteristics for a diamond structure of metallic spheres with radius r=0.21 a embedded in two different dielectrics.
Figure 17B:
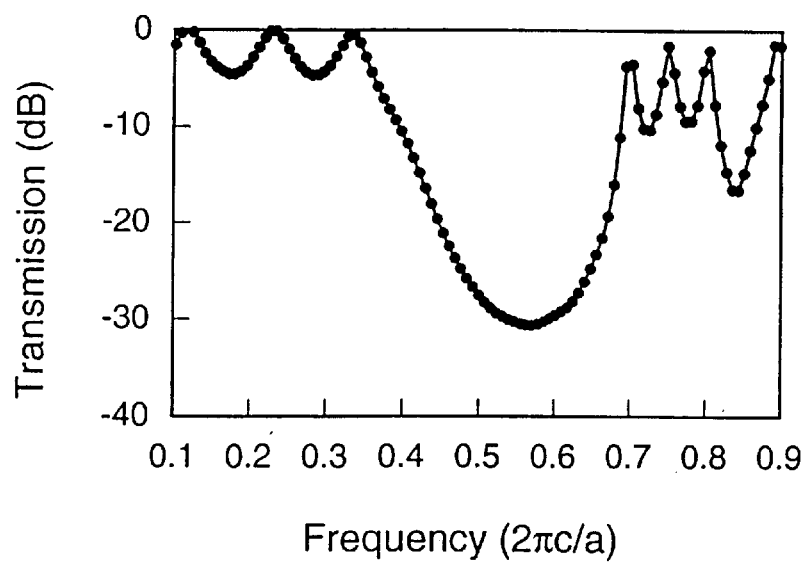

As a result, the gap widens significantly to a size of 53%, extending from frequency f=0.39 c/a to f=0.67 c/a. FIGS. 17A and 17B respectively show transmission and band diagrams for a diamond structure of metallic spheres with radius r=0.21 a embedded in Teflon® ($\epsilon$=2.1). The spheres are surrounded by cylinders filled with resin ($\epsilon$=2.5). FIG. 17A shows a band diagram for directions $\Gamma$-L, $\Gamma$-X and $\Gamma$-Z. The maximum rejection also increases to 31 dB, or 15.5 dB per lattice constant, with the same sample containing two cubic unit cells along the Z-direction as shown in the plot of FIG. 17B.

Figure 18:
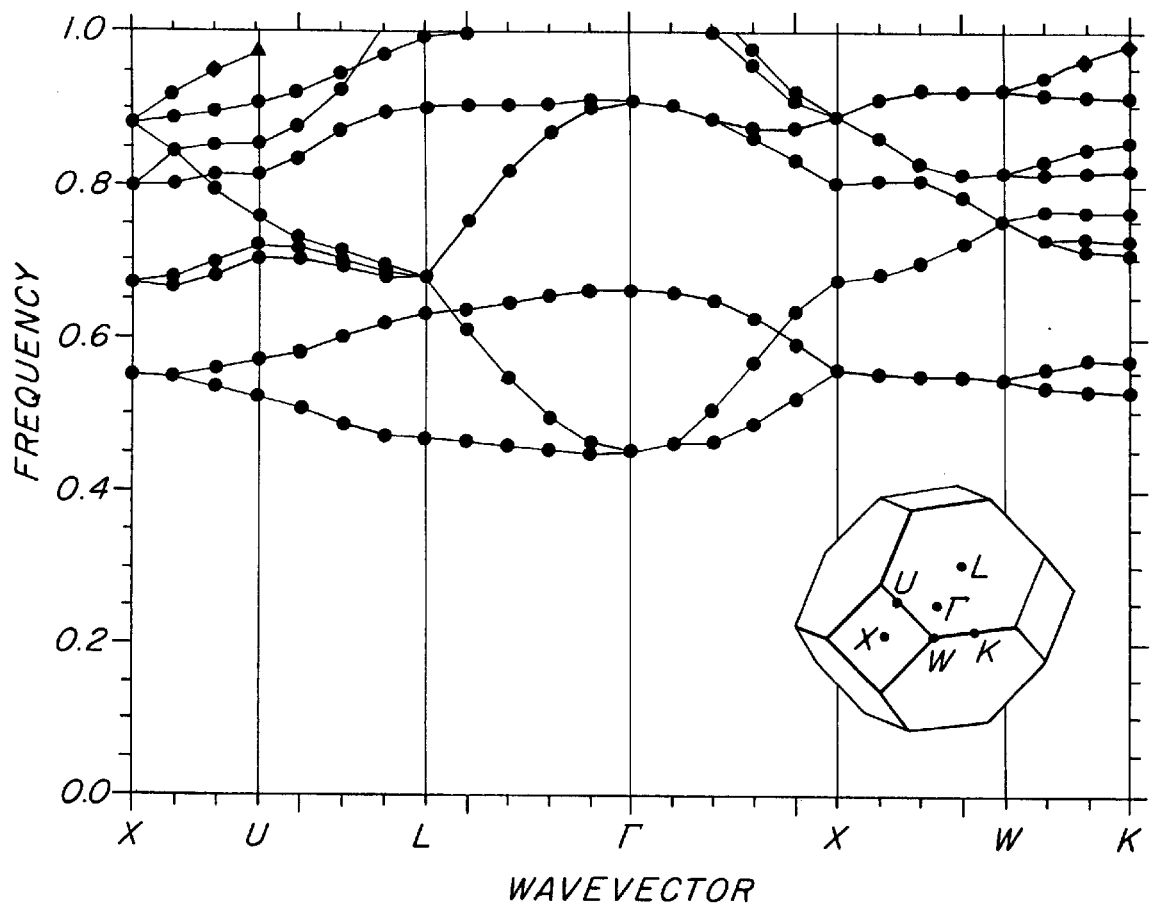
FIG. 18 is a plot of the band diagram for an exemplary embodiment of the invention in which the radius of the spheres is increased to 0.22 a so that the metallic spheres overlap.

In an exemplary embodiment of the invention, the radius of the spheres is increased to 0.22 a. In this case, the metallic spheres overlap and form a connected metallic network (instead of an array of isolated metallic cores). The band diagram for this structure is shown in FIG. 18. The differences with the embodiments of FIGS. 12, 13A and 13B are significant. The band gap previously observed no longer exists. Instead, a gap appears from zero frequency up to f=0.45 c/a.

The case where the spheres are just touching (close packing) is of great interest. Close packing occurs when the radius of the spheres is 0.2165 a. In this case, the size of the gap reaches a value of at least 68%. This gap is more than twice the size of the biggest gap ever reported in conventional all-dielectric structures.

The significant changes in the gap which result from increasing or decreasing the radius are due to the metallic nature of the spheres. The electromagnetic fields do not penetrate into the metallic spheres, hence the fields are entirely confined into the dielectric regions. By changing the geometry of the dielectric material(s) slightly, it is possible to affect the bands significantly. Unlike conventional all-dielectric photonic crystals, the gaps between the different bands do not originate from the difference between the field concentration in the high and low dielectric regions, but instead originate from the different field distributions in the dielectric materials.

The aforementioned structures easily lends themselves to the fabrication techniques described above.

It will be appreciated by those of skill in the art that in the case of perfect metals, it will not be necessary for the spheres to be made entirely of metal. Since the fields do not penetrate into the spheres, only the surface will need to be made of metal. This will not hold true for lossy metals. Also, it is possible that the elements are configured with dielectric outer surfaces with interior non-dielectric components.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A photonic crystal reflector comprising:
    a plurality of elements, each having a metallic-like component, arranged with respect to each other in a three-dimensionally periodic lattice, said non-dielectric components being spatially isolated from one another, said lattice exhibiting an omnidirectional band gap in the spectrum of electromagnetic radiation modes that defines a range of frequencies at which electromagnetic radiation is substantially prevented from propagating through said lattice so as to reflect selected frequencies from every direction; and
    a support structure positioning said elements in said three-dimensionally periodic lattice.

2. The photonic crystal of claim 1, wherein said elements comprise conductive components.

3. The photonic crystal of claim 2, wherein said elements comprise metallic components.

4. The photonic crystal of claim 1, wherein said elements comprise spherical elements.

5. The photonic crystal of claim 1, wherein said support structure comprises a dielectric material.

6. The photonic crystal of claim 1, wherein said band gap comprises a gap width to midgap frequency ratio which exceeds 25%.

7. The photonic crystal of claim 1, wherein said band gap comprises a gap width to midgap frequency ratio which exceeds 40%.

8. The photonic crystal of claim 1, wherein said band gap comprises a gap width to midgap frequency ratio which exceeds 60%.

9. A photonic crystal reflector comprising:
    a plurality of electrically conductive elements arranged in a three-dimensionally periodic diamond lattice so as to be spatially isolated from one another, said lattice exhibiting an omnidirectional band gap in the spectrum of electromagnetic radiation modes that defines a range of frequencies at which electromagnetic radiation is substantially prevented from propagating through said lattice, said band gap being defined within said spectrum such that propagating modes through said lattice exist above and below said band gap and the modes inside the band gap are reflected from every direction; and
    a support structure positioning said electrically conductive elements in said three-dimensionally periodic lattice.

10. The photonic crystal of claim 9, wherein said elements comprise metallic components.

11. The photonic crystal of claim 9, wherein said elements comprise spherical elements.

12. The photonic crystal of claim 9, wherein said support structure comprises a dielectric material.

13. The photonic crystal of claim 9, wherein said band gap comprises a gap width to midgap frequency ratio which exceeds 25%.

14. The photonic crystal of claim 9, wherein said band gap comprises a gap width to midgap frequency ratio which exceeds 40%.

15. The photonic crystal of claim 9, wherein said band gap comprises a gap width to midgap frequency ratio which exceeds 60%.

16. A method of manufacturing a three-dimensionally periodic photonic crystal reflector comprising:

forming a first layer of a dielectric material over a dielectric substrate;

forming a first layer of metal over the first layer of dielectric material;

etching the first layer of metal to form a two-dimensionally periodic pattern of metallic elements;

forming successive alternating layers of the dielectric material and metal over the first layer of metal; and etching each successive layer of metal to form a two-dimensionally periodic pattern of metallic elements in each layer of metal such that the metallic elements are arranged in the three-dimensionally periodic photonic crystal structure, said structure being dimensioned to produce an omnidirectional electromagnetic band gap which defines a range of frequencies at which electromagnetic radiation is substantially prevented from propagating through the structure so as to be reflected from every direction.

17. The method of claim 16, wherein the two-dimensionally periodic pattern of metallic elements in each metal layer is defined by photolithographic and microfabrication techniques.

18. A photonic crystal reflector comprising:

a plurality of unconnected high-electrical-conductivity elements arranged with respect to each other in a three-dimensionally periodic lattice structure dimensioned to produce an omnidirectional electromagnetic stop band which defines a range of frequencies at which electromagnetic radiation is substantially prevented from propagating through the lattice structure so as to be reflected from every direction; and a support structure positioning the high-electrical-conductivity elements in the three-dimensionally periodic lattice structure.

19. The photonic crystal structure of claim 18, wherein the high-electrical-conductivity elements are metallic.

20. The photonic crystal structure of claim 18, wherein the high-electrical-conductivity elements are spherical.

21. The photonic crystal structure of claim 18, wherein the support structure is made of a dielectric material.

22. The photonic crystal structure of claim 18, wherein the support structure comprises a plurality of sheets of dielectric material, high-electrical-conductivity elements being located in each of the sheets.

23. The photonic crystal structure of claim 22, wherein each sheet comprises a plurality of holes through the sheet in which the high-electrical-conductivity elements are located.

24. The photonic crystal structure of claim 18, wherein the support structure comprises multiple layers of dielectric material formed over a dielectric substrate.

25. The photonic crystal structure of claim 24, wherein the high-electrical-conductivity elements are formed from layers of metal interposed between the layers of dielectric material.

26. A three-dimensionally periodic photonic crystal reflector comprising:

a first layer of a dielectric material over a substrate;

a first layer of metallic elements formed over the first layer of dielectric material distributed in a two-dimensionally periodic pattern; and over the first layer of metallic elements, alternating layers of the dielectric material and metallic elements, each layer of metallic elements being distributed in a two-dimensionally periodic pattern such that a plurality of layers of metallic elements form the three-dimensionally periodic photonic crystal structure, said structure being dimensioned to produce an omnidirectional electromagnetic band gap which defines a range of frequencies at which electromagnetic radiation is substantially prevented from propagating through the structure so as to be reflected from every direction.

27. The three-dimensionally periodic photonic crystal structure of claim 26, wherein the dielectric material is a polymer.

28. A method of reflecting electromagnetic radiation comprising:

positioning a plurality of elements defining a photonic crystal, each element having a metallic-like component, arranged with respect to each other in a three-dimensionally periodic lattice, said non-dielectric components being spatially isolated from one another, said lattice exhibiting an omnidirectional band gap in the spectrum of electromagnetic radiation modes which defines a range of frequencies at which electromagnetic radiation is substantially prevented from propagating through said lattice so as to be reflected from every direction.

29. A method of reflecting electromagnetic energy comprising:

positioning a plurality of elements defining a photonic crystal, each element having an electrically conductive component, arranged with respect to each other in a three-dimensionally periodic lattice, said non-dielectric components being spatially isolated from one another, said lattice exhibiting an omnidirectional band gap in the spectrum of electromagnetic radiation modes that defines a range of frequencies at which electromagnetic radiation is substantially prevented from propagating through said lattice so as to reflect selected frequencies from every direction.

30. A method of reflecting electromagnetic radiation comprising:

positioning a plurality of electrically conductive elements defining a photonic crystal to be arranged in a three-dimensionally periodic diamond lattice so as to be spatially isolated from one another, said lattice exhibiting an omnidirectional band gap in the spectrum of electromagnetic radiation modes that defines a range of frequencies at which electromagnetic radiation is substantially prevented from propagating through said lattice, said band gap being defined within said spectrum such that propagating modes through said lattice exist above and below said band gap and the modes inside the band gap are reflected from every direction.

31. A method of reflecting electromagnetic radiation comprising:

positioning a plurality of unconnected high-electrical-conductivity elements defining a photonic crystal to be arranged with respect to each other in a three-dimensionally periodic lattice structure dimensioned to produce an omnidirectional electromagnetic stop band which defines a range of frequencies at which electromagnetic radiation is substantially prevented from propagating through the lattice structure so as to be reflected from every direction.

* * * * *